United States Patent
Herz

(10) Patent No.: US 10,469,893 B2
(45) Date of Patent: *Nov. 5, 2019

(54) INTEGRATED CAST AND SLING SYSTEM AND METHOD OF ITS OPERATION IN AN INTEROPERABLE MULTIPLE DISPLAY DEVICE ENVIRONMENT

(71) Applicant: DVDO, Inc., Santa Clara, CA (US)

(72) Inventor: William S Herz, Hayward, CA (US)

(73) Assignee: DVDO, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,751

(22) Filed: Sep. 13, 2017

(65) Prior Publication Data

US 2018/0077442 A1    Mar. 15, 2018

Related U.S. Application Data

(60) Provisional application No. 62/394,154, filed on Sep. 13, 2016.

(51) Int. Cl.
*H04N 21/41*    (2011.01)
*H04N 21/472*   (2011.01)
(Continued)

(52) U.S. Cl.
CPC ..... *H04N 21/4126* (2013.01); *G06F 3/04883* (2013.01); *H04N 21/2665* (2013.01);
(Continued)

(58) Field of Classification Search
CPC .............. G06F 3/017; H04N 21/42224; H04N 21/482; H04N 21/436; H04N 21/4622; H04N 21/4126
See application file for complete search history.

(56) References Cited

U.S. PATENT DOCUMENTS

| | | | |
|---|---|---|---|
| 2013/0169546 A1* | 7/2013 | Thomas | G06F 9/4451 345/173 |
| 2014/0109144 A1* | 4/2014 | Asnis | H04N 21/43615 725/48 |

(Continued)

*Primary Examiner* — Ricky Chin
*Assistant Examiner* — Akshay Doshi
(74) *Attorney, Agent, or Firm* — Invent Capture, LLC.; Samuel S. Cho

(57) ABSTRACT

An integrated cast and sling system capable of intermediating seamless multimedia data and playback transfers across multiple display devices is disclosed. The integrated cast and sling system contains a cast-sling box (CSB) connected to a conventional cable or satellite set-top box and a plurality of multimedia signal sources. In one instance, the CSB operates as an intermediary and specialized set-top box that provides seamless interoperability of multimedia cast or sling commands and related multimedia data and playback transfers between a gesture-based multimedia casting and slinging command device (e.g. a smart phone, a tablet computer, or another device with gesture command capabilities) and a targeted device (e.g. a television, a computer display, or an electronic device with a display unit). The CSB also provides intelligent transcoding or conversion of a sling or cast command from the gesture-based multimedia casting and slinging command device to ensure protocol compatibility with the targeted device.

13 Claims, 11 Drawing Sheets

An Embodiment of "Sling" Command Pathways in an Interoperable Multiple Display Device Environment with Novel Cast-Sling Boxes (CSB's)

(51) Int. Cl.
   *H04N 21/643*      (2011.01)
   *H04N 21/2665*     (2011.01)
   *H04N 21/436*      (2011.01)
   *H04N 21/414*      (2011.01)
   *H04N 21/43*       (2011.01)
   *H04N 21/4363*     (2011.01)
   *G06F 3/0488*      (2013.01)

(52) U.S. Cl.
   CPC ... *H04N 21/4122* (2013.01); *H04N 21/41407* (2013.01); *H04N 21/4307* (2013.01); *H04N 21/43615* (2013.01); *H04N 21/43637* (2013.01); *H04N 21/47202* (2013.01); *H04N 21/643* (2013.01)

(56) References Cited

U.S. PATENT DOCUMENTS

| | | | |
|---|---|---|---|
| 2015/0193069 A1* | 7/2015 | Di Censo | G06F 3/017 345/173 |
| 2015/0312508 A1* | 10/2015 | Phang | H04N 5/45 348/552 |
| 2016/0057203 A1* | 2/2016 | Gardenfors | H04M 1/7253 455/566 |
| 2016/0283342 A1* | 9/2016 | Kambhatla | G09G 5/006 |

* cited by examiner

A Functional Application Diagram of a Novel Cast/Sling Box (CSB)

100

An Embodiment of a Novel Cast/Sling Box (CSB) Board Block Diagram

200

An Embodiment of a Multiple Device Ecosystem with a CSB

300

An Embodiment of a System Software Stack for a Novel Cast/Sling Box (CSB)

400

An Example of Wireless Interoperability for a Novel Cast/Sling Box (CSB)

500

Visual Representation of Sling and Cast Gesture Commands
and Execution Processes

600

An Embodiment of Cast/Sling Command Processing Modules in a Command-Initiating Device and a Command-Receiving Device

700

A Hardware Block Diagram Example of a Cast/Sling Command-Initiating or Cast/Sling Command-Receiving Device

800

An Embodiment of "Cast" Command Pathways in an Interoperable Multiple Display Device Environment with Novel Cast-Sling Boxes (CSB's)

900

An Embodiment of Multiple "Cast" Commands by a Plurality of Cast-Initiating Devices to a Large Display Panel via a Novel Cast-Sling Box (CSB-1)

1000

An Embodiment of "Sling" Command Pathways in an Interoperable Multiple Display Device Environment with Novel Cast-Sling Boxes (CSB's)

1100

INTEGRATED CAST AND SLING SYSTEM AND METHOD OF ITS OPERATION IN AN INTEROPERABLE MULTIPLE DISPLAY DEVICE ENVIRONMENT

BACKGROUND OF THE INVENTION

The present invention generally relates to multimedia content sharing and transfers. More specifically, the invention relates to one or more systems and methods for transferring, streaming, authorizing, rendering, and recording visual, textual, graphical, and/or audible multimedia information in an interoperable multiple display device environment. Furthermore, the invention also relates to a novel multimedia set-top box configured to accommodate the multimedia content sharing and transfers. In addition, the invention also relates to a method of determining a multimedia content transfer target device when one or more novel multimedia set-top boxes are operating together with a plurality of potential transfer target devices.

Various consumer electronic devices in today's digital age are capable of downloading, executing, or uploading multimedia information. For example, smart phones, tablet computers, notebook computers, and Internet-connected "smart" televisions in recent years are frequently utilized for video and audio download, upload, and playback in a broadband data network-connected environment. As more consumers own and simultaneously operate a plurality of multimedia data-executable electronic devices in a typical home or office environment, seamless, immediate, and convenient multimedia data transmission, reception, recording, playback authorizations, and playback among the consumer's plurality of multimedia data-executable electronic devices are increasingly becoming more important and desirable. Unfortunately, a satisfying level of seamless, immediate, and convenient multimedia data sharing and playback interoperability among various electronic devices in a real-life home or office environment is difficult to achieve due to various factors. For example, system software or communication protocol incompatibilities among various electronic devices, misconfigured digital rights management (DRM) programs, and hardware incompatibilities among a plurality of electronic devices often prevent seamless and immediate sharing or playback of multimedia data among various devices that a consumer operates in today's home or office environment.

Furthermore, conventional user command methods and user interfaces for transmitting or receiving multimedia data from one device to another in today's home or office environment typically require fidgeting with both transmitting and receiving devices and various device settings to establish interoperable multimedia data communications. A cumbersome current state of the art in configuring the multiple device interoperability discourages a typical consumer from making any available multimedia playback devices fully interoperable for multimedia data transfer, sharing, and playback in a typical home or office environment.

Therefore, it may be advantageous to devise a novel intermediary set-top box that can provide seamless, immediate, and convenient interoperability and multimedia data transfer among a plurality of electronic devices in a multiple display device environment. Furthermore, it may also be advantageous to devise a method of determining a multimedia content transfer target device, when one or more novel multimedia set-top boxes are operating together with a plurality of potential transfer target devices for multimedia content sharing in a home or office multiple display device environment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a novel integrated cast and sling system is disclosed. This system comprises: a cast-sling box (CSB) containing a CPU or an APU, a memory unit, and at least one of a wireless LAN chipset, PCIe and PCM interfaces, a WiGig module connected to a PCIe interface, an audio codec connected to a USB interface, an IR blaster unit connected to a GPIO interface, an HDMI bridge unit for wireless HDMI input receivers, a voltage regulator, and a power supply; a cast and sling processing module executed and operated by the CSB, wherein the cast and sling processing module incorporates a user gesture interpreter, a user gesture command receiver, a sling gesture command encoder, and a cast gesture command encoder, wherein the user gesture interpreter determines a user's finger swipe gesture as a multimedia sling command involving an inbound playback transfer from a targeted device to a gesture-based multimedia casting and slinging command device intermediated by the CSB, or as a multimedia cast command involving an outbound playback transfer from the gesture-based multimedia casting and slinging command device to the targeted device intermediated by the CSB; the sling gesture command encoder configured to encode the multimedia sling command as an inbound playback transfer request to the targeted device via the CSB for a localized playback at the gesture-based multimedia casting and slinging command device; and the cast gesture command encoder configured to encode the multimedia cast command as an outbound playback transfer request from the gesture-based multimedia casting and slinging command device to the targeted device via the CSB for a remote playback at the targeted device.

DETAILED DESCRIPTION

Figure 1:
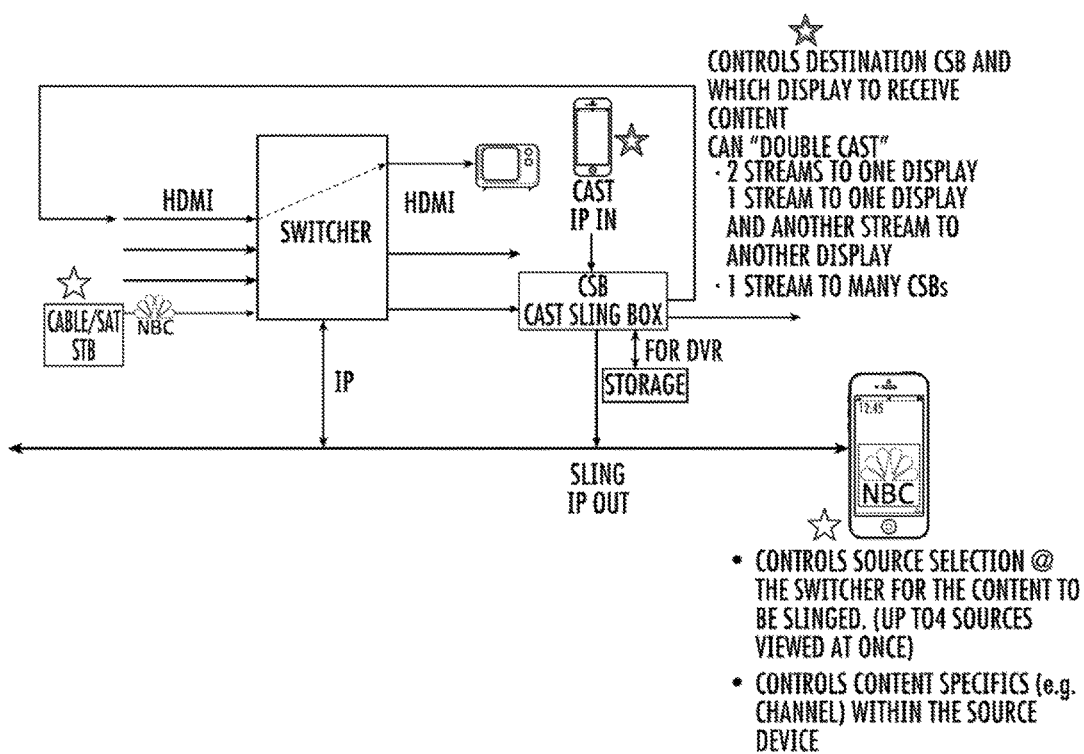
FIG. 1 shows a functional application diagram of a novel cast-sling box (CSB), in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble an integrated and potentially-concurrent cast-sling system and a method of its operation in an interoperable multiple display device environment. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term referred to as "cast," or "casting," is defined as an act of transmitting or "pushing" a multimedia content (e.g. audio, video, photo, computer-generated graphics, screen mirroring, user interface, etc.) from one electronic device to another electronic device. Furthermore, a "casting" device is defined as an electronic device executing a multimedia data transmission application for sending a multimedia content to another electronic device, which is configured to receive, playback, render, and/or record the transmitted multimedia content. In a preferred embodiment of the invention, a casting command and a corresponding multimedia data transmission process are executed in a mobile operating system (e.g. Android, iOS, etc.) environment or a computer operating system (e.g. Windows, Mac OS X, Chrome OS, etc.) environment. In one embodiment, casting can accommodate real-time outbound streaming of multimedia or IoT data to a targeted electronic device for immediate playback or recording. In another embodiment, casting can accommodate an outbound file transfer to the targeted device.

Moreover, for the purpose of describing the invention, a term referred to as "sling," or "slinging," is defined as an act of requesting, "pulling," receiving, and/or rendering a multimedia content (e.g. audio, video, photos, computer-generated graphics, etc.) from a targeted electronic device. Furthermore, a "slinging" device is defined as an electronic device executing a multimedia data rendering application that requests, receives, and plays a multimedia content transmitted from another electronic device after an on-demand request by a user. In a preferred embodiment of the invention, a slinging command and corresponding multimedia data request, receipt, and rendering processes are executed in a mobile operating system (e.g. Android, iOS, etc.) environment, a computer operating system (e.g. Windows, Mac OS X, Chrome OS, etc.) environment, or a server/cloud environment. In one embodiment, slinging can accommodate real-time streaming-in of multimedia or IoT data from a content source device for immediate playback or recording in a sling-initiating device. In another embodiment, slinging can accommodate file transfer-in from the content source device.

In addition, for the purpose of describing the invention, a term referred to as "cast-sling box," or "CSB," is defined as a novel electronic set-top box configured to provide at least three primary functions in a single set-top box unit: casting, slinging, and digital recording with full-duplex time shifting (i.e. concurrent independent recording and playback). In a preferred embodiment of the invention, a CSB is configured to act as an intermediary device among a variety of electronic devices for seamless, immediate, and convenient device interoperability in casting, slinging, displaying, and recording multimedia data. In some instances, the CSB is also configured to transcode multimedia data to provide seamless multimedia data format compatibility among the variety of electronic devices. Yet in some other instances, the CSB provides a novel feature called "referral mode," which is configured to overcome inter-device multimedia content transfer restrictions often imposed by a DRM by incorporating an automated and seamless capability to log into a user's DRM-authorized online content service account upon a user's inter-device content transfer request (e.g. a cast or sling request), and then streaming-in or downloading the DRM-authorized content directly from the online content service provider to the CSB over the Internet or another cloud-based wide-area network (WAN). The CSB can then fulfill the user's inter-device content transfer request by directing the streamed-in or downloaded DRM-authorized content to a target device.

Furthermore, the "referral mode" may also be utilized to accommodate seamless communication among an IoT device (e.g. a Nest device or sensor), an IoT device online access account (e.g. a Nest app, a Nest online device control account, etc.), and a user's consumer electronic device (e.g. a smart phone, a tablet computer, etc.) that are intermediated by the CSB. In such instances, the CSB can automatically and seamlessly log into the IoT device online access account and transfer information between the IoT device online access account and the CSB, which in turn transmits user-requested IoT information to the user's consumer electronic device. The user's consumer electronic device, in turn, can automatically launch a corresponding IoT mobile application to view and control the IoT device as a result of the communication with the CSB.

Examples of electronic devices that can be connected to and intermediated by the CSB include, but are not limited to, a smart phone, a tablet computer, a notebook computer, a wearable electronic device, an optical disc player (e.g. a Blu-ray or DVD player), a cable TV or satellite TV set-top box, a game console, and a conventional media storage and playback device (e.g. a time-shifting module integrated into or connected to a television).

Furthermore, for the purpose of describing the invention, a term "cloud," "cloud network," or "cloud computing" is defined as a data network environment in which data from an electronic system operatively connected to the data network environment is typically stored in a network-attached storage, instead of a local storage of the electronic system. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, a term "electronic system" is defined as an electronic-circuit hardware device such as a computer system, a computer server, a multimedia information-processing set-top box, a handheld device (e.g. a cellular phone, a tablet computer, a portable gaming device, etc.), a wearable electronic device (e.g. an electronic goggle with an embedded display, an implantable electronic device, other sensors, etc.), a visual monitoring system, or another electronic-circuit hardware device.

In general, one or more embodiments of the invention relate to systems and methods that can provide seamless interoperability, content sharing, and transfer among a plurality of multimedia content display devices.

More specifically, one or more embodiments of the invention relate to a novel intermediary set-top box configured to cast, sling, transcode, render, and record various multimedia contents for seamless interoperability of various electronic devices in a multiple display device environment. Furthermore, some embodiments of the invention relate to a novel intermediary set-top box configured to time-shift, transfer, IoT-trigger, and process sensor data with a resulting action.

In addition, some embodiments of the invention relate to user control interfaces for initiating and processing multimedia data among a plurality of electronic devices. More specifically, one or more embodiments of the invention relate to providing gesture-based multimedia casting and slinging command methods in an interoperable multiple display device environment.

Furthermore, some embodiments of the invention relate to electronic systems that execute user gesture-based multimedia casting and slinging commands in an interoperable multiple display device environment. A preferred embodiment of the invention may include a novel cast-sling box that acts as an intermediary device for seamless multimedia data transfer and playback interoperability among a plurality of display devices.

An objective of an embodiment of the present invention is to provide a novel intermediary set-top box called a "cast-sling box" (CSB) that uniquely incorporates multimedia data casting, slinging, transcoding, referring (i.e. referral mode), rendering, and recording capabilities for seamless interoperability of various electronic devices in a multiple display device environment.

Another objective of an embodiment of the present invention is to provide a method of determining a multimedia content transfer target device when one or more cast-sling boxes are operating together with a plurality of potential transfer source and target devices.

Another objective of an embodiment of the present invention is to provide a set of intuitive user gesture commands executed on an electronic device that enable simplified and seamless interoperability and multimedia data transfers among a plurality of electronic devices in a multiple display device environment.

FIG. 1 shows a functional application diagram (100) of a novel cast-sling box (CSB), in accordance with an embodiment of the invention. In a preferred embodiment, the cast-sling box (CSB) provides at least three functions as a single integrated set-top box unit: casting, slinging, and digital recording with full-duplex time shifting. The CSB is generally configured to act as an intermediary device among a variety of electronic devices for seamless, immediate, and convenient device interoperability in casting, slinging, displaying, and recording multimedia data. In a preferred embodiment, the CSB exhibits minimal delay in casting or slinging operations. For example, a casting or slinging request is preferably fulfilled and executed under a few seconds.

As shown by the functional application diagram (100), the CSB is capable of receiving a multimedia cast request from a cast command-initiating device (i.e. "Cast IP in") and relaying the multimedia cast request to a desirable target device (e.g. a large display device, a conventional cable/satellite set-top box, a portable electronic device with a display unit, etc.). In one embodiment, an identification marker for the desirable target device may be embedded in the multimedia cast request originating from the cast command-initiating device. In an alternate embodiment, the CSB may independently determine the desirable target device based on user preferences settings or cast-priority device lists (e.g. device proximity scheme, relative wireless network signal strength determination, etc.).

For example, if a user preference setting defines the desirable target device for casting to be a geographically-nearest display device relative to the CSB, the CSB can relay the cast command to the geographically-nearest display device, and a multimedia content from the cast command-initiating device can be streamed, rendered, and/or recorded in the geographically-nearest display device with intermediary assistance from the CSB. In another example, if a user preference setting defines the desirable target device for casting to be a largest-screen device among a plurality of display devices (e.g. a big-screen television, a plurality of portable electronic devices, a plurality of audio reception devices, etc.) connected to the CSB, then the CSB can relay the cast command to the largest-screen device (i.e. the big-screen television), and the multimedia content from the cast command-initiating device can be streamed, rendered, and/or recorded in the largest-screen device with intermediary assistance from the CSB. Examples of intermediary assistance from the CSB include, but are not limited to, transcoding, up-converting, down-converting, and/or reformatting multimedia data streams for seamless data format compatibility between a multimedia content cast initiator (e.g. the cast command-initiating device) and a cast-targeted device that subsequently renders and/or records a transmitted multimedia content. Moreover, in some embodiments, a multiple number of target devices may simultaneously receive multimedia casts from the cast command-initiating device.

Furthermore, in some embodiments of the invention, the CSB provides a novel feature called "referral mode" that can seamlessly assist indirect streaming or transfer of multimedia data between a cast-requesting device and a cast-targeted device, without a direct streaming exchange between the two devices. The referral mode may be particularly useful if a particular content desired for casting is restricted from device-to-device streaming by a DRM rule associated with the particular content. When the referral mode is enabled, the CSB is uniquely configured to overcome inter-device multimedia content transfer restrictions (i.e. often imposed by a DRM) by logging into a user's DRM-authorized online content service account upon a user's casting request, and then streaming-in or downloading the DRM-authorized content directly from the online content service provider to the CSB over the Internet or another cloud-based wide-area network (WAN). Preferably, the CSB carries a particular pointer location or another content-identifying information associated with the online content service provider to ensure that the streaming-in/downloading content is identical to the particular content desired by the user for casting. The CSB can then fulfill the user's casting request to the cast-targeted device by directing the streamed-in or downloaded DRM-authorized content to the cast-targeted device. Preferably, user login ID's, passwords, and other credentials necessary for logging into the user's DRM-authorized online content service account are inputted by the user and configured during an initial device setup (e.g. "setup wizard") stage between the cast-requesting device and the CSB. Entering the referral mode-related user credential information at the initial device setup stage enables the CSB's log-in into the user's DRM-authorized online content service account to be automated, seamless, and potentially invisible to the user, whenever the referral mode is necessary or preferred for fulfilling a casting operation due to DRM restrictions.

Continuing with the functional application diagram (100) as shown in FIG. 1, the CSB is also capable of receiving a multimedia sling request from a sling command-initiating device (i.e. "Sling IP Out") and relaying the multimedia sling request to an intended sling target device that contains a particular multimedia content, which is selected and requested by the user of the sling command-initiating device. If the intended sling target device approves the received multimedia sling request, then the particular multimedia content can be streamed and/or transferred to the sling command-initiating device via the CSB.

Furthermore, in some embodiments of the invention, the CSB provides a novel feature called "referral mode" that can seamlessly assist indirect streaming or transfer of multimedia data between a sling-requesting device and a sling-source device, without a direct streaming exchange between the two devices. The referral mode may be particularly useful if a particular content desired for slinging is restricted from device-to-device streaming by a DRM rule associated with the particular content. When the referral mode is enabled, the CSB is uniquely configured to overcome inter-device multimedia content transfer restrictions (i.e. often imposed by a DRM) by logging into a user's DRM-authorized online content service account upon a user's slinging request, and then streaming-in or downloading the DRM-authorized content directly from the online content service provider to the CSB over the Internet or another cloud-based wide-area network (WAN). Preferably, the CSB carries a particular pointer location or another content-identifying information associated with the online content service provider to ensure that the streaming-in/downloading content is identical to the particular content desired by the user for slinging. The CSB can then fulfill the user's sling request to the sling-requesting device by directing the streamed-in or downloaded DRM-authorized content to the sling-requesting device. Preferably, user login ID's, passwords, and other credentials necessary for logging into the user's DRM-authorized online content service account are inputted by the user and configured during an initial device setup stage between the sling-source device and the CSB. Entering the referral mode-related user credential information at the initial device setup stage enables the CSB's log-in into the user's DRM-authorized online content service account to be automated, seamless, and potentially invisible to the user, whenever the referral mode is necessary or preferred for fulfilling a slinging operation due to DRM restrictions.

In addition, the referral mode can also be utilized for alternative sourcing of multimedia contents via a cloud content provider. For example, when a user requests a particular multimedia content from a sling-source device to be slinged to a sling-requesting device via a CSB, the referral mode enables the CSB to find and retrieve another instance of the same multimedia content from a cloud-networked content provider. Then, the CSB can seamlessly stream-in or download the same multimedia content from the cloud-network content provider, and subsequently transmit the streamed-in or downloaded multimedia content to the sling-requesting device, without a direct and localized streaming exchange between the sling-source device and the sling-requesting device. Preferably, the CSB carries a particular pointer location or another content-identifying information associated with the cloud content provider to ensure that the streaming-in/downloading content is identical to the particular content desired by the user for slinging. The CSB can then fulfill the user's sling request to the sling-requesting device by directing the alternatively-sourced multimedia content to the sling-requesting device.

In one embodiment, an identification marker for the intended target device may be embedded in the multimedia sling request originating from the sling command-initiating device. In an alternate embodiment, the CSB may independently determine the intended target device based on user preferences settings or sling-priority device lists.

For example, if the user preference settings is set to an intelligent "slingable" content search mode, the CSB may proactively search for the particular multimedia content selected and requested by the user in a variety of multimedia devices connected to the CSB. If the particular multimedia content is found only in one particular device, then the CSB can set that one particular device as the intended target device and accommodate multimedia content sling operations from the one particular device to the sling command-initiating device. On the other hand, if the particular multimedia content is found in a plurality of devices connected to the CSB, then the CSB may autonomously (i.e. without further direct input from the sling command-initiating device) select one device as the intended target device based on the current level of data traffic congestion and hardware utilization among the plurality of sling-eligible devices. Preferably, the device selected in this manner has the lowest current level of data traffic congestion and hardware utilization, so that the sling operation is most efficiently performed between the intended target device and the sling command-initiating device.

In another example, if a user preference setting defines the intended target device for slinging to be a geographically-nearest device relative to a CSB, or a largest multimedia content storage device connected to the CSB, then the CSB can relay the sling command to the geographically-nearest display device or to the largest multimedia content storage device. If the intended target device approves the sling request, then a particular multimedia content desired by the user of the sling command-initiating device can be transmitted as a real-time stream to the sling command-initiating device via the CSB. Then, the sling command-initiating device can locally render and/or record the "slinged-in" multimedia stream with intermediary assistance from the CSB.

Furthermore, the CSB is capable of servicing one-to-one as well as one-to-many sling requests for various and customized time-shift playback points by one or more sling-requesting devices. For example, the CSB may buffer or store a user-selected "slingable" content received from a sling source device, and then transmit the user-selected "slingable" content to a plurality of sling-requesting devices at various user-selected time-shift playback points that are specified by a plurality of users who are operating the plurality of sling-requesting devices. Moreover, a particular user's action to pause, rewind, or fast-forward the user-selected "slingable" content during playback does not impact another user's action to pause, rewind, or fast-forward the same content, because each user is controlling an individual user-specific instance of the same content provided by the CSB.

Examples of intermediary assistance from the CSB include, but are not limited to, transcoding, up-converting, down-converting, and/or reformatting multimedia data streams for seamless data format compatibility between a multimedia content sling requester (e.g. the sling command-initiating device) and a sling-targeted device that subsequently transmits a selected multimedia content to the multimedia content sling requester via the CSB. Moreover, in some embodiments, the multimedia content sling requester may send a plurality of multimedia sling requests to a plurality of intended target devices to simultaneously receive, render, and/or record a multiple number of multimedia contents on its display and/or in its local data storage.

In some embodiments of the invention, the CSB is also capable of enhancing audio and/or video quality of an incoming multimedia content using various noise-filtering schemes and/or up-conversion processing methods, if the quality improvements are technically feasible and desirable for the incoming multimedia content. In such instances, the CSB transcodes and/or filters the incoming multimedia content from a sling source device to improve audio and/or video quality first, and then transmits the quality-improved multimedia data streams to one or more sling-destination devices.

Furthermore, in the preferred embodiment of the invention, the CSB's digital video recording capabilities may include "bookmarking," "slingburst," and "frame capture." In context of the CSB's feature set, a "bookmarking" feature refers to empowering a user to bookmark multiple "in" and "out" points to define one or more multimedia content segments prior to slinging of corresponding multimedia contents to a sling receiver (i.e. a sling command-initiating device), which subsequently renders and/or stores the corresponding multimedia contents in real time. Bookmarking may be performed entirely or partially by the CSB, and the CSB may process the entire data stream or merely a metadata subset (e.g "edit decision list") of the data stream. The metadata subset, which contains the edit decision list, can then be utilized by an end-user device or by the CSB to edit one or more multimedia content segments. In addition, a "slingburst" feature refers to transmission and recording of a multimedia content to the sling receiver at a current maximum-available speed of a home or office data network without being limited to an underlying bitrate of encoding, real-time streaming, rendering, and playback of the multimedia content. Moreover, a "frame capture" feature refers to photo-capturing of a user-specified still video frame via a real-time user command or pausing of a video stream accommodated by the CSB. The captured photo can be stored locally as a JPEG file or as another graphics file in the CSB or in any of the user's cast or sling command-initiating device. Furthermore, the captured photo can also be printed as a paper copy or a soft electronic copy from the CSB.

Figure 2:
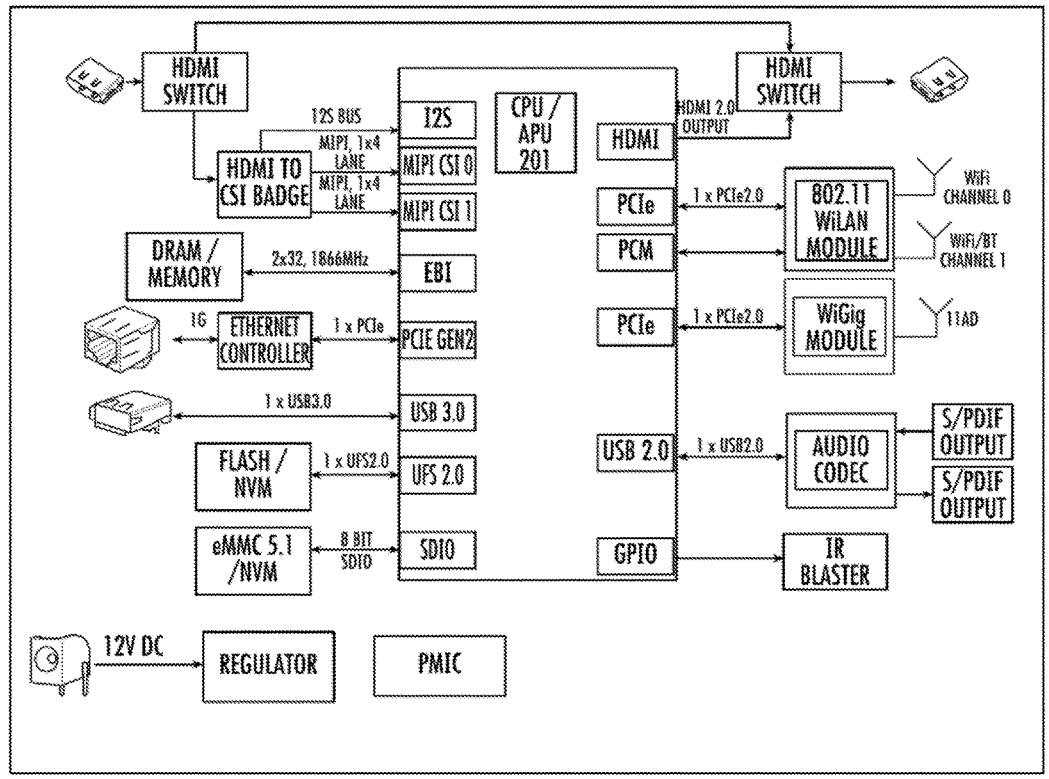
FIG. 2 shows a novel cast-sling box (CSB) board block diagram, in accordance with an embodiment of the invention.

FIG. 2 shows an example of a novel cast-sling box (CSB) board block diagram (200), in accordance with an embodiment of the invention. In this example, a CPU (central processing unit) or an APU (application processor unit) is configured to control a variety of hardware interfaces for multimedia input/output ports and other logical units utilized in functioning of the CSB. The APU, for example, can be a high-performance application processor such as Qualcomm APQ 8096. In the example shown in FIG. 2, the APU is connected to a 802.11 wireless LAN chipset via PCIe and PCM interfaces, a WiGig module via a PCIe interface, an audio codec via a USB 2.0 interface, an IR blaster unit via a GPIO interface, and an HDMI bridge unit via a MIPI CSI interface for external HDMI input solutions, such as one or more wireless HDMI input receivers. The APU is also connected to a variety of USB and other data input/output interfaces, and receives electric power via a power supply and a voltage regulator, as also shown in FIG. 2.

In a preferred embodiment of the invention, the CSB is a set-top box located in a multiple display device home or office environment, wherein the CSB operates as an intermediary unit that connects to various display devices and other electronic systems to accommodate seamless multimedia content sharing, transfer, playback, and recording interoperability. Connection to various display devices and other electronic systems may involve wireless and/or wired communication protocols. Although it may be typical to utilize wireless LAN, Bluetooth, and/or HDMI protocols for multimedia content sharing, streaming, and transfer between the CSB and various electronic devices in the multiple display device home or office environment, the CSB may also utilize cellular, satellite, Internet-based cloud networks, broadband, and/or other wide-area network (WAN) services for multimedia cast and sling operations in some embodiments of the invention.

Figure 3:
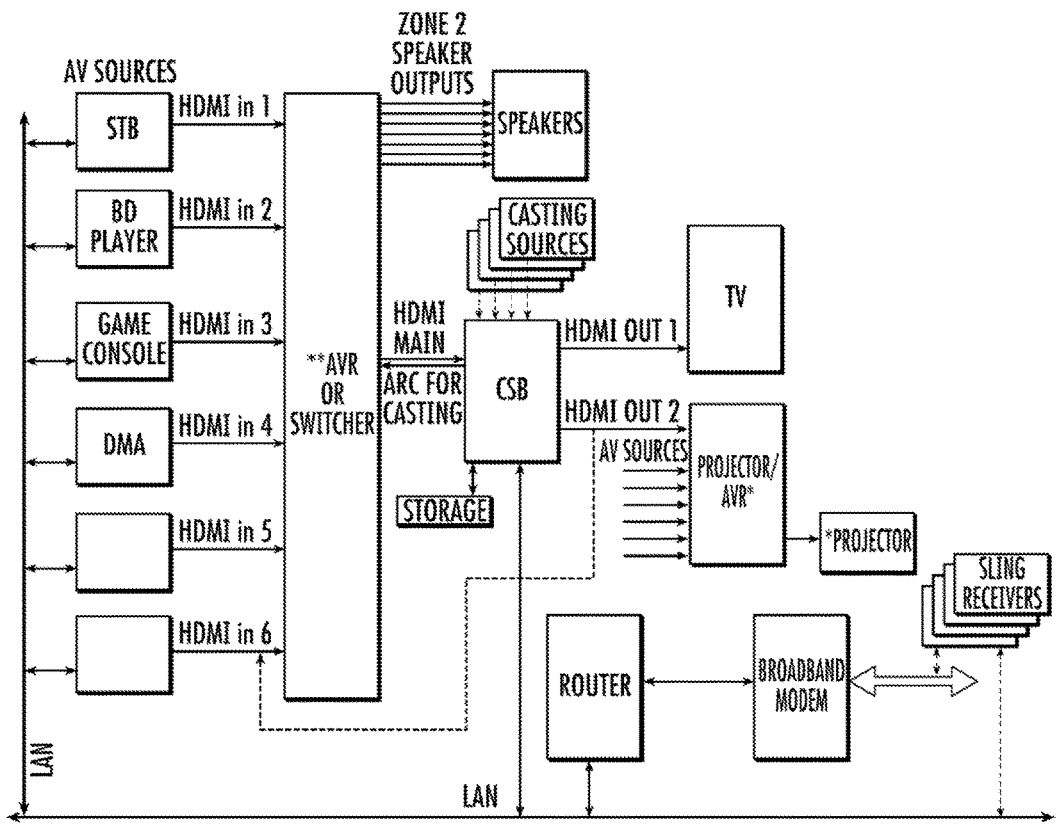
FIG. 3 shows an example of a multiple device ecosystem with a novel cast-sling box (CSB), in accordance with an embodiment of the invention.

FIG. 3 shows an example of a multiple device ecosystem (300) with a novel cast-sling box (CSB), in accordance with an embodiment of the invention. In a preferred embodiment of the invention, the CSB can connect to a broadband data network via a home or office LAN, and is preferably configured by a designated administrator. The CSB is capable of seamlessly connecting or disconnecting to a plurality of cast command-initiating devices, sling command-initiating devices, and other electronic devices that receive and process cast or sling commands. Unless a registration account is terminated by the administrator, users are able to walk into a room, an office space, or another place with multiple display devices, and immediately start casting or slinging upon issuing a cast or sling command with their registered electronic devices.

Furthermore, in some embodiments of the invention, the CSB is also operatively connected to IoT (Internet of Things) devices, which can be controlled by an authorized user device. For example, an IoT-enabled lamp in a room or an office space can be turned on or off by a user's smart phone that executes a user interface application for the CSB and/or for IoT management, as long as the user's smart phone is already registered and permitted to control the IoT-enabled lamp. In addition, the user interface application for the CSB and/or for IoT management may be configured to integrate a plurality of IoT device-specific applications into one combined user interface for controlling the plurality of IoT devices.

Preferably, the seamless interoperability of multiple connected devices is at least in part provided by the CSB that accommodates immediate and automated in-range device connections and disconnections, which automatically occur when a particular device is within a defined range (e.g. 200 ft, 50 ft, 10 ft, etc.) for data communication, similar to range-based automatic device connection schemes provided by Bluetooth and WiFi LAN protocols. The automated device detection, connection, and disconnection may require proximity-based CSB detection schemes. For example, a cast or sling command-initiating device may be configured to determine the nearest CSB to its current location and automatically connect to that nearest CSB, if there are a multiple number of CSB's within an automated device connection range. Alternatively, the cast or sling command-initiating device may connect to a particular CSB designated by a user in a user connection preferences setting, regardless of other CSB's that may be also present in the data access range.

Moreover, in some embodiments of the invention, choosing particular communication methods and/or protocols for device connections and multimedia content transfers among one or more CSB's and other electronic devices can be based on a current level or a targeted level of power consumption. For example, if a mobile device (e.g. a smart phone, a tablet computer, a smart watch, etc.) connected to a CSB currently has a low battery level, one or more application programs executed in the CSB and/or the mobile device may determine that a communication method should be switched from a wireless HDMI protocol to a high compression protocol via a wireless LAN to reduce battery consumption in the mobile device. Preferably, the transition between one communication method and/or protocol to another is uninterrupted and seamless, at least from the user's perspective.

Similarly, if the power consumption settings for the mobile device and/or one or more CSB's are configured to be in a "power conserve" mode, a communication method that consumes the least amount of electrical power for executing a particular communication task may be automatically chosen by the one or more application programs executed in the mobile device and the one or more CSB's. In contrast, if the power consumption settings for the mobile device and/or the one or more CSB's are configured to be in a "maximum performance quality" mode, a communication method that provides the highest quality multimedia data transfer may be automatically chosen by the one or more application programs executed in the mobile device and the one or more CSB's, even if the chosen communication method consumes high amounts of electrical power.

Furthermore, a device that has not been previously registered by the CSB may be required to go through an initial registration process. The initial registration process may be introduced as part of a setup wizard in the CSB and also in a client application (e.g. a mobile app or a PC app) executed on the device. In the preferred embodiment, device registrations to the CSB are achieved by the CSB creating its own private network within an available home or office broadband data network, which allows a user device to switch over to the CSB's private network to register and establish the user device on the CSB's private network. Devices that are not authorized to be registered by a CSB and/or network administrator, a security firewall, or another security-controlling entity cannot access a LAN and/or a WAN connected to the CSB. Furthermore, even if a particular device is registered with the CSB, the security-controlling entity (e.g. the CSB and/or network administrator, the security firewall, etc.) may not authorize the particular device to access a home/office network or a broader network outside a localized and/or private network defined for the CSB-related communication.

Furthermore, in the preferred embodiment, a quality of service (QoS) policy may be incorporated into the CSB that allows the CSB and a connected device to the CSB to optimize types of dynamically-switchable data communication protocols for video, audio, and/or graphics quality for sling and cast operations, based on a current line of sightedness or distance between the CSB and the connected device. For example, the connected device may receive a slinged-in multimedia content via the CSB using an uncompressed wireless HDMI protocol when there is a direct line-of-sightedness (LoS) at a close distance between the CSB and the connected device. Typically, the uncompressed wireless HDMI protocol can provide a higher-quality multimedia playback experience at the expense of requiring more bandwidth and line-of-sightedness. If the connected device leaves the LoS range as the user is still watching the slinged-in multimedia content played back on the connected device, then the CSB and the connected device can dynamically and uninterruptedly switch to a wireless LAN protocol, a cellular data protocol, or another communication protocol that supports non-line-of-sightedness (NLoS) and/or data compression to utilize available bandwidth in greater distances, even if the communication protocol switching compromises the multimedia image, video, and/or audio quality. Likewise, if the connected device comes back within the LoS range relative to the CSB, the QoS policy may dynamically and uninterruptedly switch back from a longer-range and compression-based protocol to the uncompressed wireless HDMI protocol. Preferably, in context of the current availability of network bandwidth and line-of-sightedness, the QoS policy is configured to support the highest possible multimedia video, audio, and/or graphics quality for sling or cast operations between communicating devices without interruption, even when they are moving closer to or away from the CSB.

Preferably, the CSB is capable of providing interoperable compatibilities among a variety of electronics devices for multimedia content sharing, transfer, and playback in a home or office environment. Examples of electronic devices that can be connected to and intermediated by the CSB include, but are not limited to, a smart phone, a tablet computer, a notebook computer, a wearable electronic device, an optical disc player (e.g. a Blu-ray or DVD player), a cable TV or satellite TV set-top box, a game console, an audio system, a large display panel, and a conventional media storage and playback device (e.g. a time-shifting module integrated into or connected to a television).

Figure 4:
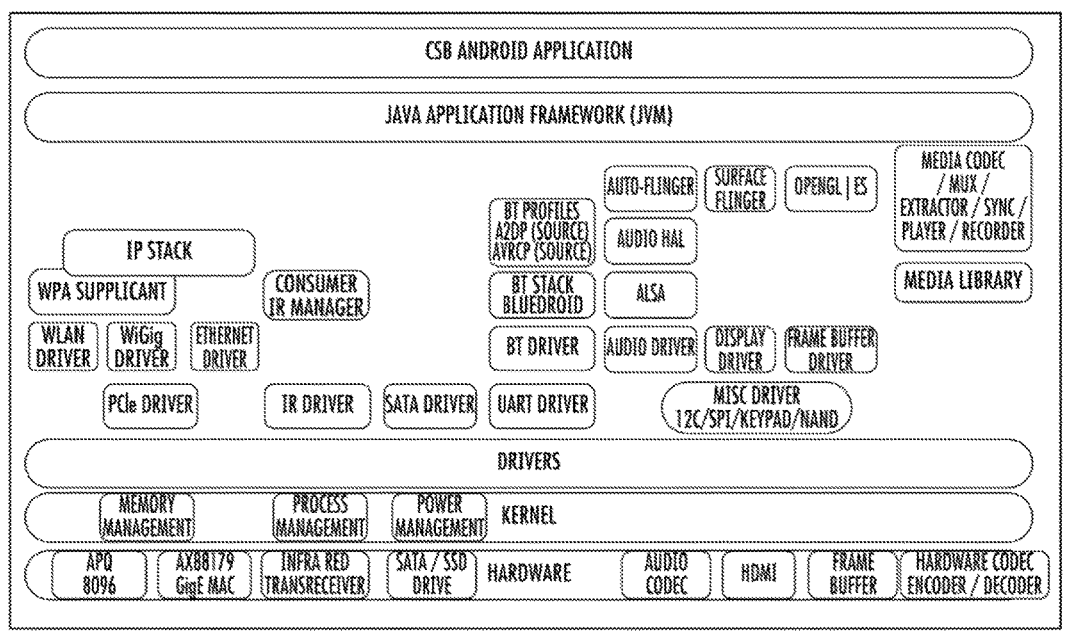
FIG. 4 shows a system software stack for a novel cast-sling box (CSB), in accordance with an embodiment of the invention.

FIG. 4 shows a system software stack (400) for a novel cast-sling box (CSB), in accordance with an embodiment of the invention. In this particular example, the system software stack (400) utilizes APQ8096 application processor-based hardware layer, kernels, and various communication drivers. This example also utilizes a Java Virtual Machine (JVM) framework and Android-compatible application layers. The effective result of creating this particular system software stack (400) is an Android application-compatible operating environment for a cast-sling box (CSB). In another embodiment, an iOS-specific system software stack or a Windows-specific system software stack may be created with corresponding underlying drivers, kernels, and hardware units. Yet in another embodiment, a special-purpose and proprietary system software stack may be created just for a particular cast-sling box (CSB) as part of a proprietary system software development kit (SDK) that may be specific to a brand or a set-top box manufacturer.

Figure 5:
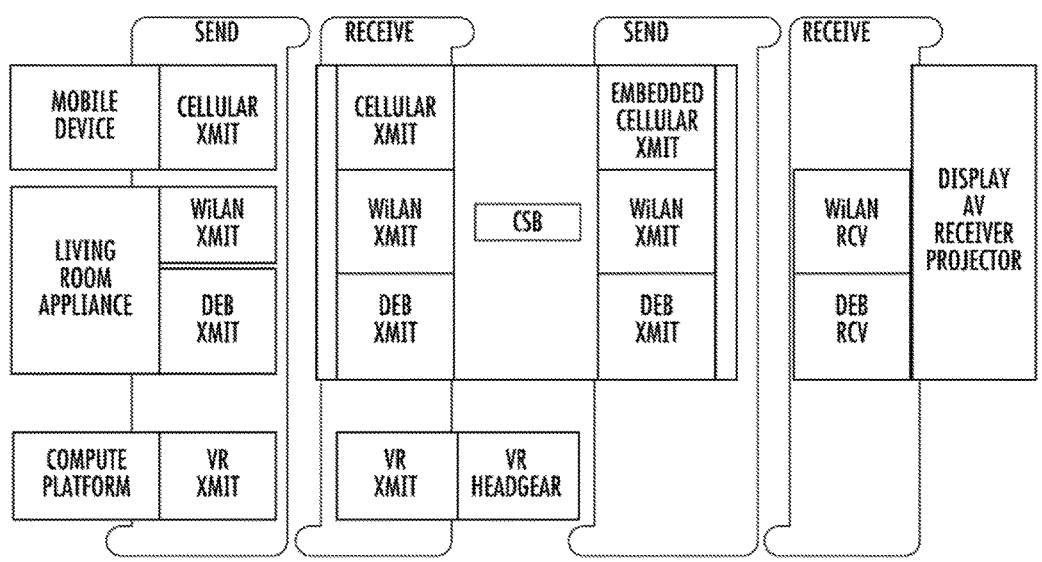
FIG. 5 shows an example of wireless interoperability for a novel cast-sling box (CSB), in accordance with an embodiment of the invention.

FIG. 5 shows an example of wireless interoperability (500) for a novel cast-sling box (CSB), in accordance with an embodiment of the invention. This example is specific to the 802.11AD standard for cast and sling operations from mobile devices, living room appliances, and other electronic devices to display units, AV receivers, and projectors that are intermediated by a CSB for interoperable compatibility, as shown in the diagram in FIG. 5. In another embodiment of the invention, another wireless protocol or standard may be utilized to provide seamless interoperability among a plurality of multimedia content storage, playback, and projection devices, which are intermediated by one or more CSB's.

Figure 6:
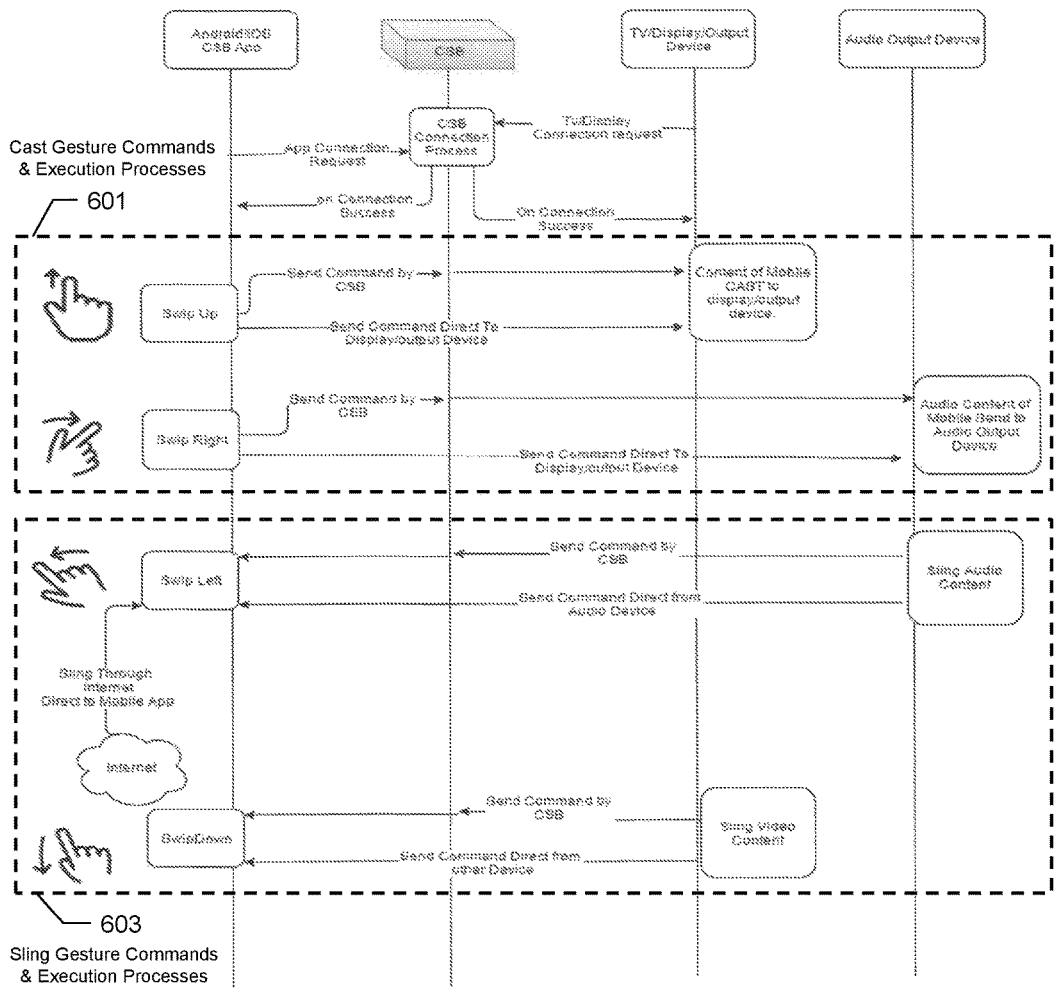
FIG. 6 shows a visual representation of sling and cast gesture commands and execution processes, in accordance with an embodiment of the invention.

FIG. 6 shows a visual representation (600) of sling and cast gesture commands and execution processes, in accordance with an embodiment of the invention. In this particular embodiment, sling and cast gesture commands are executed on an Android or iOS touch-screen device, such as a smart phone or a tablet computer. In another embodiment, similar or identical sling and cast gesture commands can be executed on another type of touch-screen electronic device that utilizes Windows, Linux, or another operating system. As shown in the visual representation (600) of this embodiment, a finger swipe-up gesture and a finger swipe-right gesture are two types of "cast" commands.

In a preferred embodiment of the invention, a user command to initiate "casting" of an audio/video (AV), graphical, or photographic multimedia content from the touch-screen electronic device to a targeted device (e.g. a television, another portable electronic display device, a cast-sling box, etc.) is a finger swipe-up gesture command. The swipe-up gesture may be particularly intuitive for a "casting" command that initiates multimedia content transmission because a finger swipe-up motion mimics a physical motion of pushing, throwing, or sending an item from the touch-screen electronic device to the targeted device. In particular, the user may feel that the finger swipe-up gesture for multimedia casting initiation is akin to "throwing" the content towards a targeted device (e.g. towards a television in the same room, a nearby portable electronic device with a display panel, a cast-sling box which further executes casting to an end destination device, etc.).

Furthermore, in the preferred embodiment of the invention, a user command to initiate "casting" of an audio content to wireless speakers (e.g. Bluetooth-enabled speakers) or to a wirelessly-networked audio system (e.g. Sonos devices on SonosNet) from the touch-screen electronic device is a finger swipe-right gesture command. In an alternate embodiment of the invention, this user command may be performed by a finger swipe-left gesture command or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a casting gesture command. Defining a cast-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a casting command. For example, a "throwing" motion or forward motion from a cast command-initiating device towards a targeted device can be quantified with a gyroscopic accelerometer integrated in the cast command-initiating device to determine a "cast vector." In such embodiments, the cast vector defines the direction and the magnitude of the user's accelerative motion that can be measured and analyzed to initiate a cast command to the targeted device.

Moreover, in some embodiments of the invention, "air gestures," or non-physical-contact-based user gestures that are typically sensed and detected by visual and/or ultrasonic sensors, may also be supported by a cast command-initiating device to measure, determine, and initiate a casting command. A preferred air gesture in one embodiment of the invention may be a "throwing" motion or a "push" motion near the cast command-initiating device towards a cast-targeted device. Yet in some embodiments of the invention, voice commands may be utilized to initiate a casting command. A clear voice command, such as " . . . Cast Content A to Target Device B . . . ," may be issued by a user, which can be interpreted by the cast command-initiating device and converted into electrical signals for a specific cast command to a targeted device.

The "cast" commands may be transmitted directly to a targeted device (e.g. "TV/Display/Output Device" or "Audio Output Device" elements in FIG. 6), or indirectly to the targeted device via an intermediary unit, such as a cast-sling box (CSB), as shown in FIG. 6. In case of user-triggered cast commands and execution processes (601) for the embodiment as shown in FIG. 6, a user's gesture command (e.g. a finger swipe-up, a finger swipe-right, a gyro accelerometer-sensed gesture for a cast command vector, etc.) is first interpreted by a multimedia casting and slinging command user interface application, which is executed on the Android or iOS touch-screen device. Then, the multimedia casting and slinging command user interface application determines and correlates the user's gesture command to a particular type of a cast initiation command (e.g. an AV or computer graphics visual multimedia cast initiation command that corresponds to the finger swipe-up, or an audio cast initiation command that corresponds to the finger swipe-right). Subsequently, a corresponding electronic signal to initiate the particular type of multimedia casting is transmitted to the targeted device either directly to the targeted device, or indirectly to the targeted device via an intermediary set-top box, such as the CSB.

The targeted device may incorporate an authorization and permissions control to allow or prevent multimedia casting on the targeted device, wherein the multimedia casting involves display, playback, or recording of a multimedia content transmitted from the Android or iOS touch-screen device. In addition, in some embodiments of the invention, administrative rights may supersede or override user controls or user priorities.

Furthermore, in the embodiment of the invention as shown in FIG. 6, the targeted device (e.g. a television, a peer portable device, another multimedia output device) is typically selected by the user before the user issues a cast-initiating gesture command. Alternatively, a targeted device may be automatically selected or determined by the multimedia casting and slinging command user interface application, or by the cast-sling box based on device proximity, user casting target preferences settings, or another casting target-determining algorithms.

In the preferred embodiment of the invention, the multimedia casting and slinging command user interface application executed on the touch-screen electronic device also provides gesture-based commands to initiate "slinging" (i.e. requesting, receiving, playing, and/or storing) of multimedia contents from a targeted device. A user command to initiate "slinging" of an audio/video (AV), graphical, or photographic multimedia content from the targeted device (e.g. a television, another portable electronic display device, a cast-sling box, etc.) is a finger swipe-down gesture command. The swipe-down gesture may be particularly intuitive for a "slinging" command that initiates multimedia content transfer-in request and reception from the targeted device to the touch-screen electronic device because a finger swipe-down motion mimics a physical motion of "pulling-in" or receiving an item into the touch-screen electronic device. In particular, the user may feel that the finger swipe-down gesture for multimedia slinging initiation is akin to "bringing" the content towards the user from a targeted device.

Moreover, in the preferred embodiment of the invention, a user command to initiate "slinging" (i.e. requesting, receiving, playing, and/or storing) of an audio content from a targeted device to the touch-screen electronic device is a finger swipe-left gesture command. The targeted device may be a peer-to-peer device configured to transmit the audio content directly to the touch-screen electronic device upon request from a user, who initiates the audio content sling procedure via the finger swipe-left gesture command. Alternatively, the targeted device may be a networked device (e.g. a computer server executing an audio library, a Sonos-receiving node, another wirelessly-networked device, etc.) capable of transmitting the audio content to the touch-screen electronic device via a wireless network, if the user makes the audio content sling request with the finger swipe-left gesture command. In one embodiment of the invention, multimedia contents accessible by the Sonos-receiving node can also be "slinged" to a CSB-connected device, such as a mobile device, a tablet computer, or a wireless speaker connected to the CSB. Typically, the Sonos-receiving node is configured to access an audio library portal to retrieve and playback a variety of audio contents on Sonos-connected devices and wireless speakers. By connecting the Sonos-receiving node to the CSB, a registered device connected to the CSB is also able to interact with a Sonos control user interface and access (e.g. sling) various audio contents that are retrievable from the Sonos-receiving node.

Furthermore, in an alternate embodiment of the invention, this user command may be performed by a finger swipe-right gesture or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a slinging gesture command. Defining a sling-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a slinging command. For example, a "pulling-in" motion from a targeted device towards a sling content-receiving device can be quantified with a gyroscopic accelerometer integrated in a sling command-initiating device to determine a "sling vector." In such embodiments, the sling vector defines the direction and the magnitude of the user's accelerative motion that can be measured and analyzed to initiate a sling command to the targeted device.

Moreover, in some embodiments of the invention, "air gestures," or non-physical-contact-based user gestures that are typically sensed and detected by visual and/or ultrasonic sensors, may also be supported by a sling command-initiating device to measure, determine, and initiate a slinging command. A preferred air gesture in one embodiment of the invention may be a "pulling-in" motion from a sling-targeted device towards a sling content-receiving device, which can be the sling command-initiating device or another device. Yet in some embodiments of the invention, voice commands may be utilized to initiate a slinging command. A clear voice command, such as " . . . Sling Content C from Target Device D to Device E . . . ," may be issued by a user, which can be interpreted by the sling command-initiating device and converted into electrical signals for a specific sling command to a targeted device.

The preferred embodiment of the invention, as described above and as shown in FIG. 6, does not limit the scope of other embodiments of the invention, which may utilize different finger swipe patterns, arrangements, or other user gestures for correlating casting and slinging initiations with gesture-based user commands executed on the touch-screen electronic device. Furthermore, the touch-screen electronic device may be a portable electronic device (e.g. a smart phone, a tablet computer, a notebook computer, a portable gaming device, etc.), a wearable electronic device with an embedded display unit, or a display unit connected to a television, a computer server, a kiosk, or another less portable electronic system, which may be utilized in a connected home or office environment.

Continuing with the embodiment of the invention as shown in FIG. 6, in case of user-triggered sling commands and execution processes (603), a user's gesture command (e.g. a finger swipe-down, a finger swipe-left, etc.) is first interpreted by a multimedia casting and slinging command user interface application, which is executed on the Android or iOS touch-screen device. Then, the multimedia casting and slinging command user interface application determines and correlates the user's gesture command to a particular type of a sling initiation command (e.g. an AV or computer graphics visual multimedia sling initiation command that corresponds to the finger swipe-down, or an audio sling initiation command that corresponds to the finger swipe-left). Subsequently, a corresponding electronic signal to initiate the particular type of multimedia slinging is transmitted to the targeted device either directly to the targeted device, or indirectly to the targeted device via an intermediary set-top box, such as the CSB.

The targeted device may incorporate an authorization and permissions control to allow or prevent multimedia slinging from the targeted device to the Android or iOS touch-screen device, wherein the multimedia slinging involves receiving a multimedia content sling request from the Android or iOS touch-screen device, allowing or denying the multimedia content sling request, and transmission of a requested multimedia content to the Android or iOS touch-screen device. In addition, in some embodiments of the invention, administrative rights may supersede or override user controls or user priorities.

Furthermore, in the embodiment of the invention as shown in FIG. 6, the targeted device (e.g. a television, a peer portable device, another multimedia output device) and a particular multimedia content for slinging are typically selected by the user before the user issues a sling-initiating gesture command. Alternatively, a targeted device and/or a particular multimedia content for slinging may be automatically selected or determined by the multimedia casting and slinging command user interface application, or by the cast-sling box based on device proximity, user slinging target preferences settings, or another slinging target-determining algorithms (e.g. QoS, network type selection, DVR, on-screen, cast-to-sling, etc.).

Moreover, in some embodiments of the invention, choosing particular communication methods and/or protocols for device connections and multimedia content transfers among one or more CSB's and other electronic devices for cast or sling-related operations can be based on a current level or a targeted level of power consumption. For example, if a mobile device (e.g. a smart phone, a tablet computer, a smart watch, etc.) connected to a CSB currently has a low battery level, one or more application programs executed in the CSB and/or the mobile device may determine that a communication method should be switched from a wireless HDMI protocol to a high compression protocol via a wireless LAN to reduce battery consumption in the mobile device. Preferably, the transition between one communication method and/or protocol to another is uninterrupted and seamless, at least from the user's perspective.

Similarly, if the power consumption settings for the mobile device and/or one or more CSB's are configured to be in a "power conserve" mode, a communication method that consumes the least amount of electrical power for executing a particular communication task may be automatically chosen by the one or more application programs executed in the mobile device and the one or more CSB's. In contrast, if the power consumption settings for the mobile device and/or the one or more CSB's are configured to be in a "maximum performance quality" mode, a communication method that provides the highest quality multimedia data transfer may be automatically chosen by the one or more application programs executed in the mobile device and the one or more CSB's, even if the chosen communication method consumes high amounts of electrical power.

Moreover, in some embodiments of the invention, network selection for transmission of multimedia contents after execution of casting or slinging commands may be intelligently determined based on at least one of inter-device proximity, network speed, power state or preferences, and QoS rules associated with transmitting and receiving devices. For example, an intelligent network selection algorithm executed by a CSB may select the highest-throughput and uncompressed communication protocol between a multimedia content-transmitting device and a multimedia content-receiving device, if the two devices are within line of sight (LoS). If the two devices are further apart and are not in line of sight, then the intelligent network selection algorithm may choose the next-best protocol that provides a relatively high data throughput under the current inter-device proximity. Similarly, the intelligent network selection algorithm may choose the highest possible network speed for accommodating casting or slinging of multimedia contents between the multimedia content-transmitting device and the multimedia content-receiving device.

Furthermore, in some instances, the intelligent network selection algorithm may select a communication protocol that provides best energy efficiency for inter-device communications among a plurality of available protocols. For example, if energy efficiency is configured as the user's important preference in the CSB, the intelligent network selection algorithm executed in the CSB may choose Bluetooth (IEEE 802.15 standard) for a particular cast operation instead of WiFi (IEEE 802.11 standard) or LTE (cellular network 4G), because Bluetooth may provide a higher energy efficiency than those offered by other available protocols. Moreover, the intelligent network selection algorithm may also incorporate one or more specific quality-of-service (QoS) rules associated with data-transmitting and data-receiving devices for cast and sling operations. In such instances, the QoS rules can take precedence over other available network selection methods.

Figure 7:
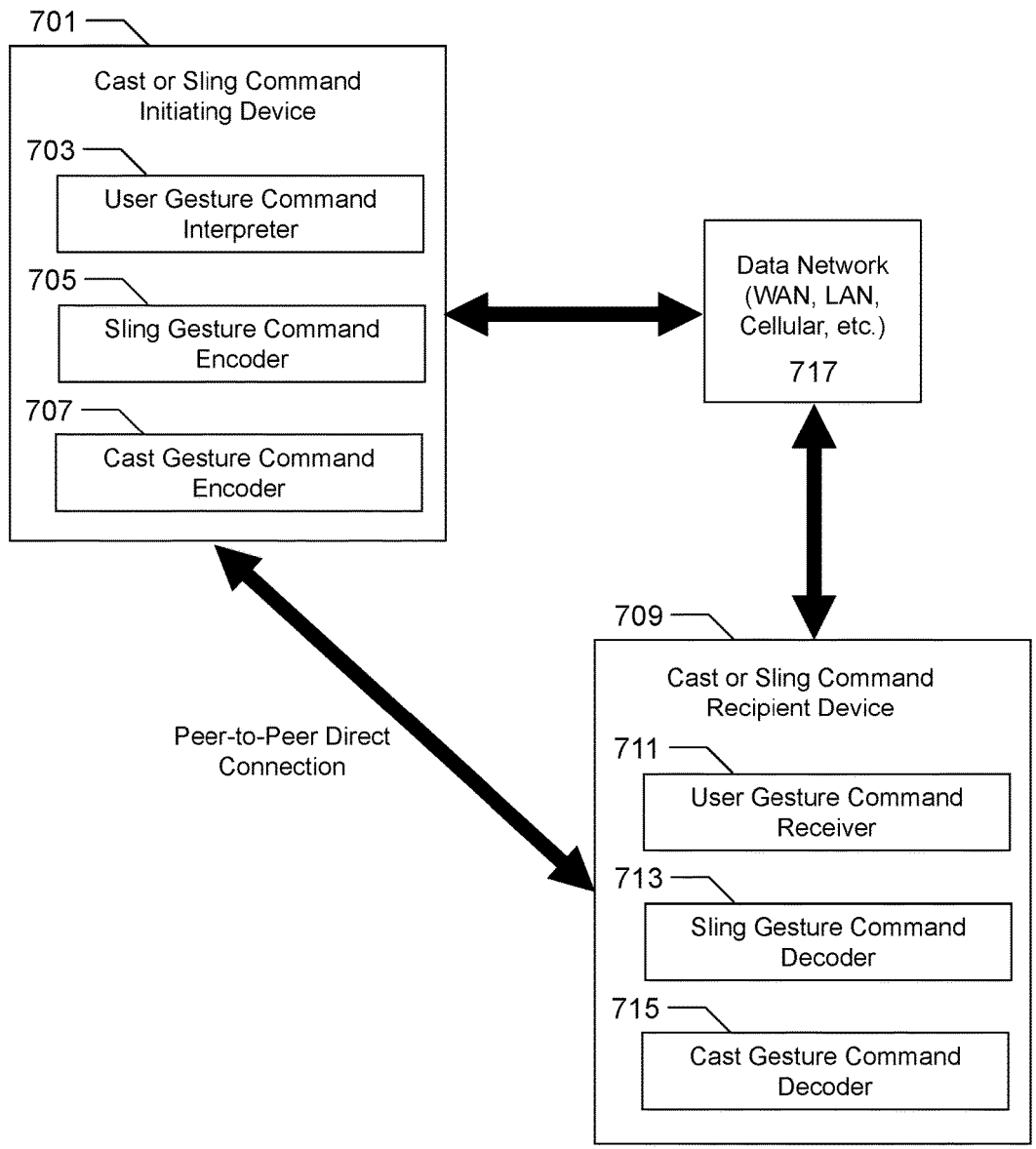
FIG. 7 shows an example of cast/sling command processing modules in a command-initiating device and a command-receiving device, in accordance with an embodiment of the invention.

FIG. 7 shows an example (700) of cast/sling command processing modules in a command-initiating device and a command-receiving device, in accordance with an embodiment of the invention. In this example (700), a cast or sling command-initiating device (701) includes a user gesture command interpreter (703), a sling gesture command encoder (705), and a cast gesture command encoder (707). The cast or sling command-initiating device (701) may be a smart phone, a tablet computer, a wearable electronic device, a special-purpose cast-sling box remote controller with a touch screen, or another electronic device equipped with a touch screen display unit.

The cast or sling command-initiating device (701) incorporates a memory unit, a central processing unit (CPU), and/or an application processor unit (APU), which are configured to control or execute the user gesture command interpreter (707), the sling gesture command encoder (705), and the cast gesture command encoder (707). In a preferred embodiment of the invention, the user gesture command interpreter (703), the sling gesture command encoder (705), and the cast gesture command encoder (707) are part of a mobile application configured to work in an Android or iOS environment, or a desktop/notebook computer application configured to work in a Windows or Mac OS X environment. The multimedia casting and slinging command user interface application described in conjunction with FIG. 6 can be the mobile application or the desktop/notebook computer application that contain the user gesture command interpreter (703), the sling gesture command encoder (705), and the cast gesture command encoder (707).

In another embodiment, the user gesture command interpreter (703), the sling gesture command encoder (705), and the cast gesture command encoder (707) may be at least partially implemented in a semiconductor chip as an application-specific integrated circuit, a field-programmable gate array (FPGA), a graphical processing unit (GPU), a central processing unit (CPU), or another hardware logic component.

In the preferred embodiment of the invention, the user gesture command interpreter (703) incorporated in the cast or sling command-initiating device is configured to analyze a user's swiping gesture pattern, speed, and/or pressure on a touch screen. If the user's swiping motion matches a profile of a particular cast or sling command, then the user gesture command interpreter (703) instructs either the sling gesture command encoder (705) or the cast gesture command encoder (707) to generate a corresponding electronic signal and/or a data packet, which is subsequently transmitted to a cast or sling command-recipient device (709) via a P2P direct connection or via a data network (717), as shown in FIG. 7. In some embodiments, one or more CSB's may be connected between the cast or sling command-initiating device (701) and the cast or sling command-recipient device (709) via the data network (717) to act as intermediary unit(s) for seamless device compatibility, data transcoding, format conversions, buffering, and/or recording. In other embodiments, the cast or sling command-initiating device (701) and the cast or sling command-recipient device (709) are connected directly or via the data network (717) without any CSB involvement. Transmission of electronic signals and/or data packets may involve data compression, encryption, and video quality control enhancements and settings in the P2P direct connection or the data network (717) connection, based on user preferences, security requirements, and quality-of-service (QoS) parameters.

Continuing with the example (700) shown in FIG. 7, the cast or sling command-recipient device (709) may be a portable electronic device, a television, an audio system, an intermediary unit (e.g. a cast-sling box) configured to provide seamless interoperability among a plurality of cast or sling command-capable devices, or another multimedia-playable electronic device directly or indirectly connected to the cast or sling command-initiating device (701). In this embodiment of the invention, the cast or sling command-recipient device (709) includes a user gesture command receiver (711), a sling gesture command decoder (713), and a cast gesture command decoder (715).

The cast or sling command-recipient device (709) incorporates a memory unit, a central processing unit (CPU), and/or an application processor unit (APU), which are configured to control or execute the user gesture command receiver (711), the sling gesture command decoder (713), and the cast gesture command decoder (715). In a preferred embodiment of the invention, the user gesture command receiver (711), the sling gesture command decoder (713), and the cast gesture command decoder (715) are part of a mobile application configured to work in an Android or iOS environment, or a desktop/notebook computer application configured to work in a Windows or Mac OS X environment. The multimedia casting and slinging command user interface application described in conjunction with FIG. 6 can be the mobile application or the desktop/notebook computer application that contain the user gesture command receiver (711), the sling gesture command decoder (713), and the cast gesture command decoder (715). In another embodiment, the user gesture command receiver (711), the sling gesture command decoder (713), and the cast gesture command decoder (715) may be at least partially implemented in a semiconductor chip as an application-specific integrated circuit, a field-programmable gate array (FPGA), a graphical processing unit (GPU), a central processing unit (CPU), or another hardware logic component.

In the preferred embodiment of the invention, the user gesture command receiver (711) incorporated in the cast or sling command-recipient device is configured to receive an electronic signal and/or a data packet containing an encoded sling command or an encoded cast command from the cast or sling command-initiating device (701). The user gesture command receiver (711) is also configured to identify, categorize, authenticate, decompress, and/or decrypt the electronic signal and/or the data packet as the encoded sling command or the encoded cast command. If the electronic signal and/or the data packet are identified as the encoded sling command, then the electronic signal and/or the data packet are sent to the sling gesture command decoder (713), which decodes and further identifies a specific type of sling command (e.g. requesting transmission of a visual multimedia content, an audio content, or an IoT sensor data readout value from the sling command-recipient device, etc.).

On the other hand, if the electronic signal and/or the data packet are identified as the encoded cast command, then the electronic signal and/or the data packet are sent to the cast gesture command decoder (715), which decodes and further identifies a specific type of cast command (e.g. requesting receipt and processing of a visual multimedia content or an audio content streaming from the cast command-initiating device, etc.).

In some embodiments of the invention, the sling gesture command decoder (713) and the cast gesture command decoder (715) may not need to exist as separate logical units for processing cast or sling commands originating from the command-initiating device, if the incoming electronic signal and/or the data packet already contain native device-level commands that the command-recipient device can readily understand and decipher without dedicated gesture command decoders. Furthermore, in some embodiments of the invention, cast or sling commands may be interpreted, transcoded, and/or decoded by an intermediary unit (e.g. a CSB) before any cast or sling-related commands reach a final destination device for receiving and responding to such commands.

Figure 8:
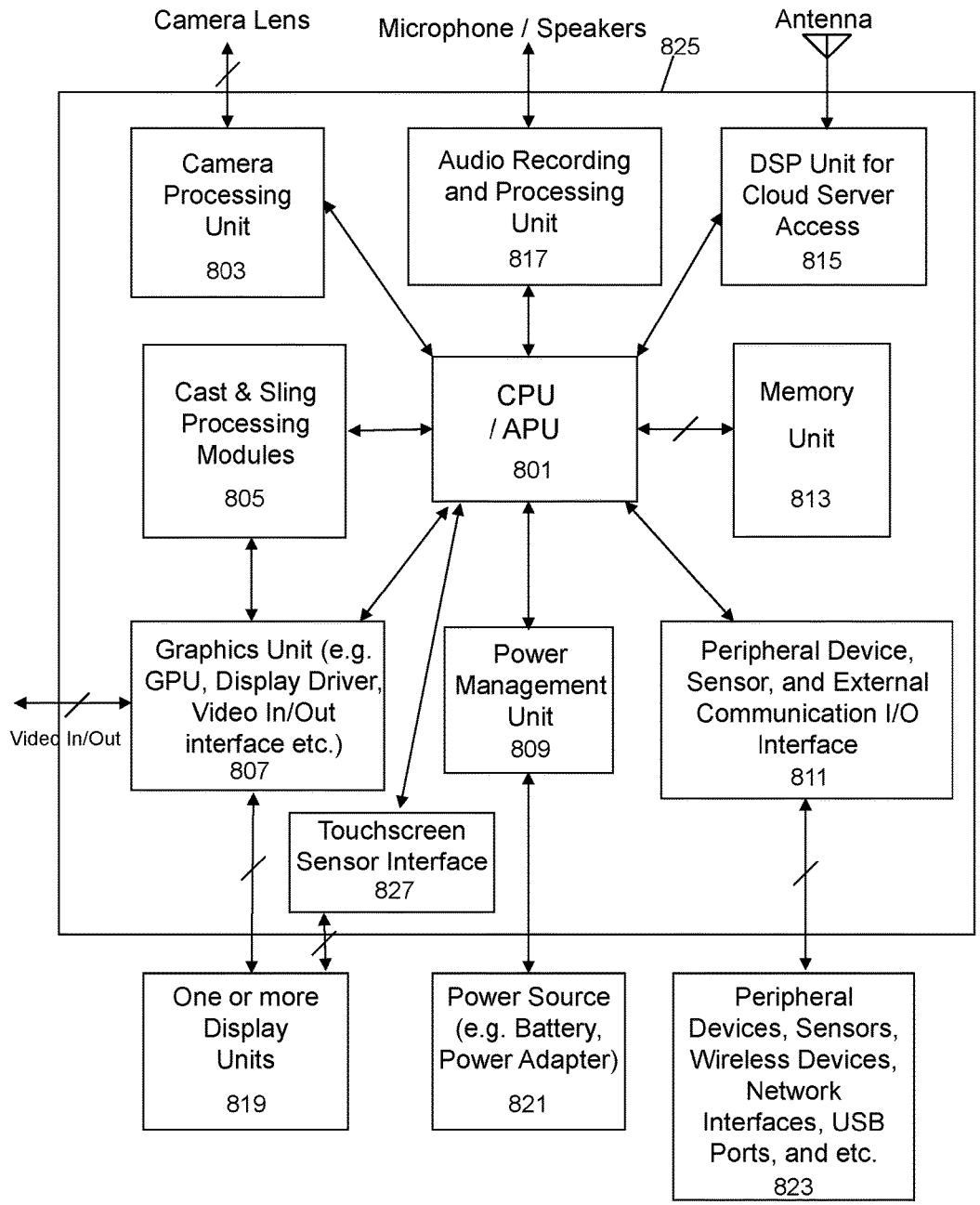
FIG. 8 shows a hardware block diagram example of a cast/sling command-initiating or cast/sling command-receiving device, in accordance with an embodiment of the invention.

FIG. 8 shows a hardware block diagram example (800) of an electronic system representing a cast/sling command-initiating or cast/sling command-receiving device, in accordance with an embodiment of the invention. The cast/sling command-initiating or command-receiving device may be a portable electronic device, a wearable electronic device, a computer display panel, a kiosk, a television, another electronic device with a touch-sensitive display panel, or a cast-sling box (CSB). In a preferred embodiment of the invention, the cast/sling command-initiating or command-receiving device contains one or more cast and sling processing modules, which have been described, for example, as various modules (i.e. elements 703, 705, 707, 711, 713, 715) in association with FIG. 7.

In a preferred embodiment of the invention, the block diagram of the cast/sling command-initiating or cast/sling command-receiving device incorporates a central processing unit (CPU) (801) or an application processor unit (APU), which is operatively connected to a memory and/or data storage unit (813), cast and sling processing modules (805), a camera processing unit (803) connected to a camera lens, a graphics unit (807) (e.g. a graphics processor, a display driver, and etc.), a power management unit (809), a peripheral device, sensor, and/or external communication I/O interface (811), a digital signal processing (DSP) unit for cloud server access (815), and an audio recording and processing unit (817), which is operatively connected to a microphone and one or more speakers. These logical units may be placed on a single printed circuit board (825) in one embodiment of the invention, or on a plurality of printed circuit boards in another embodiment of the invention.

In the preferred embodiment of the invention, the CPU/APU (801) is configured to control each logical unit operatively (i.e. directly or indirectly) connected to the CPU/APU (801). The memory and/or data storage unit (813) typically comprises volatile memory banks based on DRAM's. In some embodiments of the invention, the memory and/or data storage unit (813) may use non-volatile memory technologies such as SRAM's and/or Flash memory. The memory and/or data storage unit (813) is capable of storing programs, applications, and/or multimedia files that can be executed by the CPU/APU (801), the graphics unit (807), or another logical unit operatively connected to the memory and/or data storage unit (813). Furthermore, in the preferred embodiment of the invention, cast and sling processing modules (805) executed on the CPU/APU (801) and the memory and/or data storage unit (813) of the electronic system provide various cast/sling user gesture command interpretations, command encodings and decodings, multimedia data transmission and receipt management, multimedia data recording, and multimedia data playback functionalities.

Moreover, in the preferred embodiment of the invention, the electronic system representing the cast/sling command-initiating or cast/sling command-receiving device is capable of performing data encryption, decryption, graphical rendering, and various multimedia format conversions and processing by utilizing the CPU/APU (801), the graphics unit (807), and/or another logical unit operatively connected to the memory and/or data storage unit (813).

In addition, in the preferred embodiment of the invention, a touchscreen sensor interface (827) may be connected to the CPU/APU (801) and one or more display units (819), which may embed capacitive or other types of touch sensors to detect user touch inputs and gestures. The touchscreen sensor interface (827) is configured to read and interpret touch sensor values transmitted from the one or more display units (819). In some embodiments of the invention, pressure sensing may provide an additional dimension of user control for sling and cast commands by interpreting various pressure levels of the user input. For example, a user may define opacity (i.e. transparency or translucency levels) of a viewing window by changing finger pressures on the user interface during multimedia content casting to a target device. In this example, a stronger finger pressure may turn the viewing window more opaque, while a lighter finger pressure may transition the viewing window to be more transparent. Furthermore, in some embodiments, an air gesture sensor may also be connected to the peripheral device, sensor, and/or external communication I/O interface (811) to support air gestures for cast or sling user commands. Moreover, the electronic system as illustrated in FIG. 8 may also provide data encryption, decryption, compression, decompression, and conversion based on security and QoS requirements of incoming or outgoing multimedia contents.

Continuing with the embodiment of the invention as shown in FIG. 8, any software and programs executed on the CPU/APU (801) and the memory and/or data storage unit (813) of the electronic system may be part of an operating system, or a separate application installed on the operating system of the electronic system. Furthermore, in this particular embodiment, the camera processing unit (803) is operatively connected to a camera lens on the electronic system, and is able to process real-time image-related data from the camera lens via the CPU/APU (801) and/or other logical units in the electronic system to provide a camera lens-captured multimedia video feed that can be utilized in a cast or sling process executed by the cast/sling command-initiating and cast/sling command receiving device. Moreover, the microphone operatively connected to the audio recording and processing unit (817) can produce live recorded audio content, which can also be utilized in a cast or sling process executed by the cast/sling command-initiating and cast/sling command receiving device.

Furthermore, as shown in FIG. 8, the digital signal processing (DSP) unit for cloud server access (815) is operatively connected to an radio frequency (RF) antenna. The DSP unit for cloud server access (815) is generally configured to receive and transmit multimedia data and/or voice signals wirelessly for a mobile communication device, a wireless audio system, a smart television, an electronic goggle, or another suitable electronic system. In addition, the electronic system representing the cast/sling command-initiating or cast/sling command-receiving device is also configured to communicate via a physical wired connection, such as an Ethernet cable or a fiber optic cable.

In addition, the power management unit (809) is operatively connected to a power supply unit and a power source (e.g. battery, power adapter) (821), and the power management unit (809) generally controls power supplied to the electronic system (i.e. the cast/sling command-initiating or cast/sling command-receiving device). Moreover, the peripheral device, sensor, and/or external communication I/O interface (811) as shown in FIG. 8 can be operatively connected to one or more peripheral devices, wireless devices (e.g. WiLAN, Bluetooth, SonosNet, etc.), USB ports, USB-enabled devices, and other external data communication media (823).

Continuing with the embodiment of the invention shown in FIG. 8, the graphics unit (807) in the system block diagram (800) for the electronic system comprises a graphics processor, a display driver, a dedicated graphics memory and/or data storage unit, and/or another graphics-related logical components. In general, the graphics unit (807) is able to process and communicate graphics-related data with the CPU/APU (801), the display driver, and/or the dedicated graphics memory and/or data storage unit. The graphics unit (807) is also operatively connected to one or more display units (819) and is operatively connected to video in/out ports, an HDMI interface, and/or another multimedia port. In addition, the CPU/APU (801) is operatively connected to the audio recording and processing unit (817) for generation of audio sound via wired or wireless speakers, wherein the audio sound may be at least partially "slinged" from a targeted device after a sling command is executed for the electronic system. Moreover, the CPU/APU (801) operatively connected to the audio recording and processing unit (817) is configured to manage and control recording of aural information from the microphone operatively connected to the electronic system, which can subsequently be "casted" to a targeted device for a localized audio content replay from the targeted device (e.g. a television speaker, a wireless audio speaker on a SonosNet, a peer-connected smart phone, etc.) after a cast command is fully executed.

Figure 9:
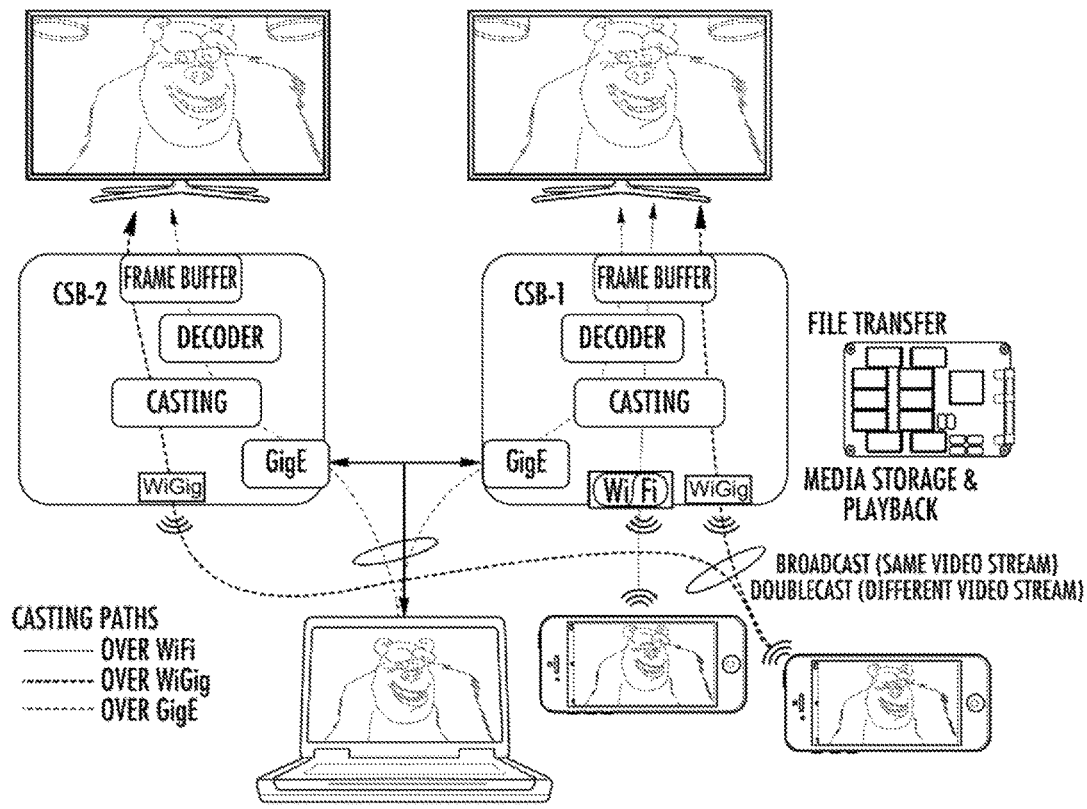
FIG. 9 shows "cast" command pathways in an interoperable multiple display device environment with novel cast-sling boxes (CSB's), in accordance with an embodiment of the invention.

FIG. 9 shows "cast" command pathways (900) in an interoperable multiple display device environment with novel cast-sling boxes (CSB's), in accordance with an embodiment of the invention. Preferably, each cast command is initiated with a user's swipe-up or swipe-right gesture command on a cast command-initiating device, as previously described in the Specification. One potential cast command pathway is from a cast command-initiating device (e.g. a portable electronic device such as a notebook computer, a smart phone, a tablet computer device, a portable gaming device, an electronic goggle, etc.) to a first cast-sling box (CSB-1) and/or to a second cast-sling box (CSB-2), which is further connected to one or more large display devices, as shown in FIG. 9. This potential cast command pathway can be implemented with a matching pair of WiFi, WiGig, GigE transceivers, and/or wireless network routers. Alternatively, the potential cast command pathway from the portable electronic device to either of the CSB's can also be supported by peer-to-peer direct communication protocols, such as Bluetooth and HDMI standards. This potential cast command pathway may be wireless, physical-cable connected, or a combination of both wired and wireless configurations.

In this embodiment, an end destination device (i.e. also described herein as a "targeted device,") is a large display device intermediated by CSB-1 and/or CSB-2 for seamless interoperability in casting command executions between the portable electronic device and the large display device. In other embodiments of the invention, one or more targeted devices may be other electronic devices that incorporate display units. Furthermore, the presence of CSB's in executing multimedia cast commands may not be necessary in some embodiments, if devices are able to establish direct multimedia content transfer compatibility for casting and slinging activities.

Moreover, in the embodiment of the invention as shown in FIG. 9, the portable electronic device may be configured to "broadcast" or "double-cast" to one or more CSB's. In a "broadcasting" application of a multimedia data stream from the portable device to CSB's, a single multimedia content originating from the portable electronic device is "casted" to designated CSB's, thus resulting in a playback or recording of the same single multimedia content at each of the targeted device (e.g. one or more large display panels connected to the designated CSB's.). Alternatively, the portable device may also be configured to "double-cast," or selectively transfer two distinct multimedia contents simultaneously to one or more CSB's. Preferably, each CSB is capable of processing "double-casted" multimedia contents and displaying one or both of the casted contents simultaneously on the large display panels, as shown in FIG. 9. In some embodiments of the invention, the portable device is also configured to transfer even more than two distinct multimedia contents simultaneously to one or more CSB's, and each CSB is capable of processing the plurality of distinct multimedia contents concurrently.

Furthermore, as shown in the embodiment of the invention of FIG. 9, each CSB, if connected between the targeted device and the portable electronic device, is capable of receiving, decoding, accepting, or denying cast commands, decoding an incoming "casted" multimedia content from the portable device, and selectively transcoding the incoming "casted" multimedia content to provide seamless compatibility to the targeted device, if the CSB determines that transcoding enhances compatibility with the targeted device. Moreover, the CSB is also capable of buffering the decoded or transcoded multimedia frames in a memory unit and transmitting the decoded or transcoded multimedia content to the targeted device (e.g. a large display panel connected to a CSB) to accommodate the user's cast command from the portable device.

In some embodiments of the invention, one or more CSB's (e.g. CSB-1, CSB-2, etc.) can be "cascaded" to execute one or more levels of cast-to-sling or sling-to-cast operations. For example, a first user device may initiate a cast command to CSB-1 or to a large display screen connected to CSB-1. As the casted multimedia content is recorded and/or played back via CSB-1 on the large display screen, a second user device may request slinging of the same multimedia content from the large display screen via CSB-2. In this particular example, the sling request from the second user device may be fulfilled by CSB-2 subsequently sending and establishing a sling connection with CSB-1 that has been casting to the large display device. Therefore, a single level of cast-to-sling operation has been established in this example. Furthermore, the cast-to-sling or sling-to-cast operation can also be achieved with just a single CSB in some embodiments, if multiple user devices connected to the single CSB are making various cast or sling requests for the same multimedia content processed by the single CSB. Moreover, multiple levels or depths of cast-to-sling or sling-to-cast operations are also achievable in some embodiments of the invention, if one or more CSB's are connected to a plurality of user devices to relay and process multimedia contents in a cascaded manner (e.g. "cast-to-sling-to-cast-to-sling . . . ," "sling-to-cast-to-sling-to-cast . . . ," etc.). In some embodiments, casted contents displayed in a plurality of windows of a user interface can be individually slinged to another device via the user interface.

In an alternate embodiment of the invention, the portable device and the targeted device may be able to accommodate multimedia casting between the two devices directly without intermediary execution processes and/or transcoding provided by a CSB. In such situations, direct casting without CSB intermediations may require installation of an embedded cast/sling command analysis and decoding module on the targeted device that correlates and complements the multimedia cast/sling command user interface and encoding modules executed on the portable electronic device, or on another cast command-initiating device.

Figure 10:
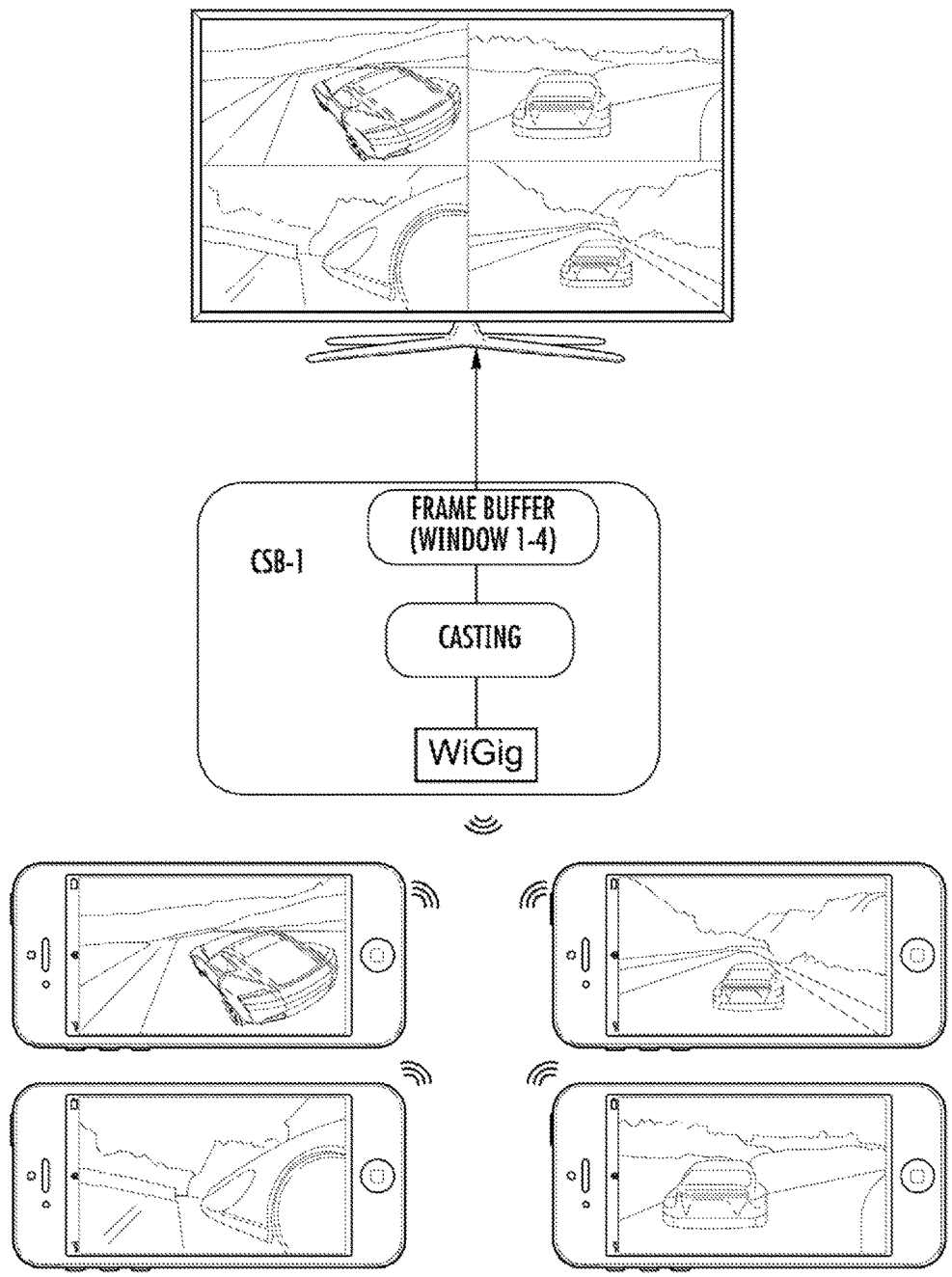
FIG. 10 shows multiple "cast" commands by a plurality of cast-initiating devices to a large display panel via a novel cast-sling box (CSB-1), in accordance with an embodiment of the invention.

FIG. 10 shows multiple "cast" commands by a plurality of cast-initiating devices to a large display panel via a novel cast-sling box (CSB-1) as a multi-cast command pathway (1000), in accordance with an embodiment of the invention. The multi-cast command pathway (1000) involves transmitting a multiple number of distinct multimedia contents from a plurality of cast command-initiating devices (e.g. portable electronic devices such as notebook computers, smart phones, tablet computer devices, portable gaming devices, electronic goggles, etc.) to a first cast-sling box (CSB-1), which is further connected to a large display device, as shown in FIG. 10. This cast command pathway can be implemented with a matching pair of WiFi, WiGig, GigE transceivers, and/or wireless network routers between each cast command-initiating device and the first cast-sling box. Alternatively, the cast command pathway for this multi-cast application can also be supported by peer-to-peer direct communication protocols, such as Bluetooth and HDMI standards. The multi-cast command pathway may be wireless, physical-cable connected, or a combination of both wired and wireless configurations.

In this embodiment, an end destination device (i.e. also described herein as a "targeted device,") is the large display device intermediated by CSB-1 for seamless interoperability in casting command executions between the cast command-initiating device and the large display device. In other embodiments of the invention, the targeted device may be another electronic device that incorporates a display unit. Furthermore, the presence of a CSB in executing multimedia cast commands may not be necessary in some embodiments, especially if devices are able to establish direct multimedia content transfer compatibility for casting and slinging activities.

Moreover, in the embodiment of the invention as shown in FIG. 10, each portable electronic device and the CSB-1 are configured to multi-cast to the targeted device (e.g. the large display device). The CSB-1 is capable of simultaneously decoding, transcoding, and/or processing four distinct multimedia contents and transmit each of the four decoded, transcoded, and/or processed multimedia contents to the large display device, which in turn displays the four distinct multimedia contents simultaneously on its display panel, as shown in FIG. 10. Depending on the user preferences command or device settings, the CSB-1 may selectively transmit one or more distinct multimedia contents to the large display device for playback, while recording one or more distinct multimedia contents in the CSB-1's non-volatile data storage, regardless of their playback status on the large display device when the multi-cast mode is activated.

As shown in the embodiment of the invention of FIG. 10, the CSB-1, if connected between the targeted device and each portable electronic device, is capable of receiving, decoding, accepting, or denying cast commands, decoding an incoming "casted" multimedia content from the portable device, and selectively transcoding the incoming "casted" multimedia content to provide seamless compatibility to the targeted device, if the CSB-1 or if a quality improvement (e.g. image quality, audio quality, network traffic analysis-based analysis, etc.) application determines that transcoding enhances compatibility with the targeted device. Furthermore, the CSB-1 is also capable of buffering the decoded or transcoded multimedia frames in a memory unit and transmitting the decoded or transcoded multimedia content to the targeted device to accommodate the user's cast command from the portable device.

In an alternate embodiment of the invention, the plurality of portable devices and the targeted device may be able to accommodate multimedia multi-casting among the connected devices directly without intermediary execution processes and/or transcoding provided by the CSB-1. In such situations, direct multi-casting without CSB intermediations may require installation of an embedded cast/sling command analysis and decoding module on the targeted device that correlates and complements the multimedia cast/sling command user interface and encoding modules executed on each portable electronic device, or on another cast command-initiating device.

Figure 11:
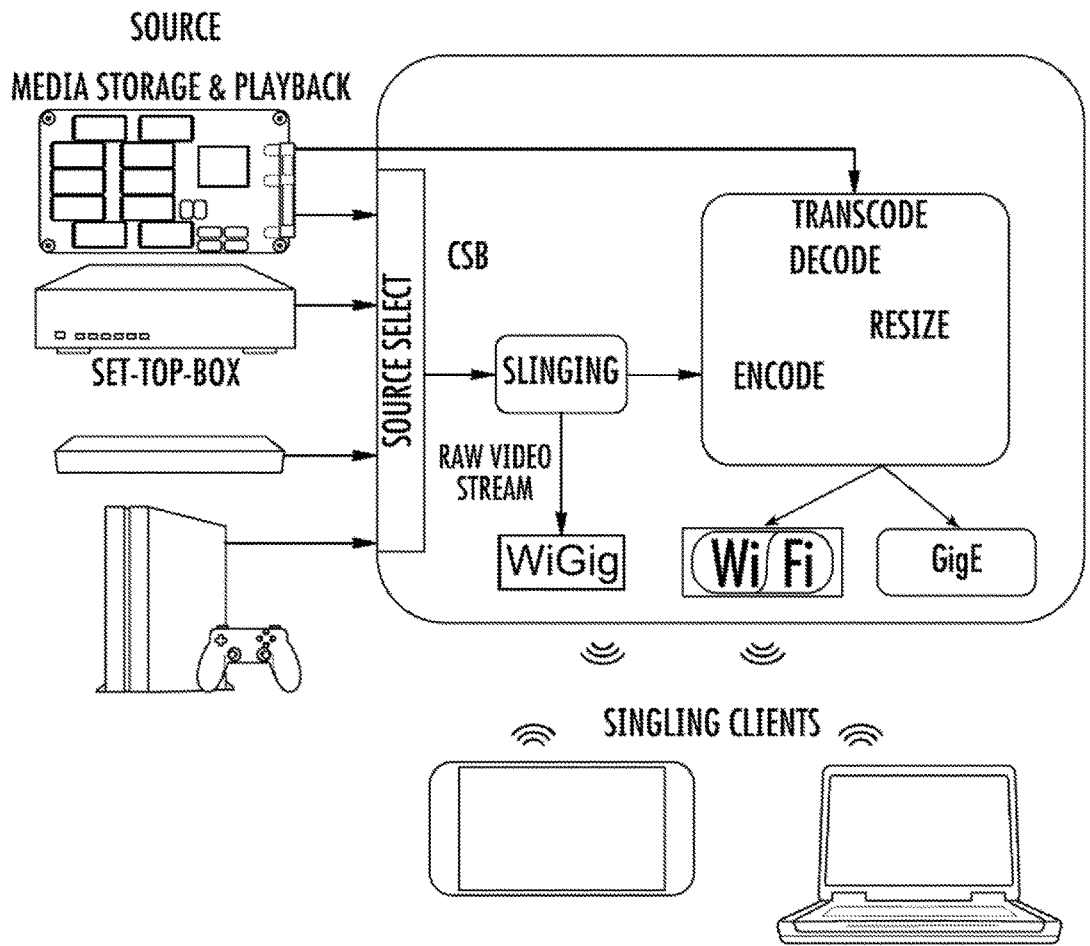
FIG. 11 shows "sling" command pathways in an interoperable multiple display device environment with a novel cast-sling box (CSB), in accordance with an embodiment of the invention.

FIG. 11 shows "sling" command pathways (1100) in an interoperable multiple display device environment with a novel cast-sling box (CSB), in accordance with an embodiment of the invention. Preferably, each sling command is initiated with a user's swipe-down or swipe-left gesture command on a sling command-initiating device, as previously described in the Specification. A typical sling command pathway is started with a sling request from a sling command-initiating device (e.g. a portable electronic device such as a notebook computer, a smart phone, a tablet computer device, a portable gaming device, an electronic goggle, etc.) to the CSB, which further communicates with an end target device (e.g. a media storage and playback system, a television set-top box, an optical media disc player, a game console, etc.) that typically contains multimedia contents that can be selected by the user and slinged (i.e. transferred, transmitted, re-directed, etc.) to the sling command-initiating device for playback and/or localized storage. Furthermore, in some embodiments of the invention, the CSB can be connected to an environmental sensor, such as a security camera, a home security system, and/or an Internet-of-Things (IoT) device, to function as a home or office automation control box. With various sensor connections, the CSB can also provide proximity sensing for home or office security applications. A user device connected to the CSB can then readily "sling" (i.e. retrieve) environmental sensor or IoT device output values to the user device by issuing a sling command via the CSB. Likewise, in such embodiments of the invention, the user device can also transmit sensor control commands to the environmental sensor via the CSB.

Furthermore, in some embodiments of the invention, IoT devices and other electronic devices connected to the CSB can be seamlessly and automatically activated or deactivated by a sling or cast command-issuing device via the CSB's intermediary commands that can turn on or turn off the CSB-connected devices, depending on desirable states of each CSB-connected device for a particular user command or a current user device proximity to the CSB, IoT devices, and other electronic devices. For example, a user holding a command-issuing device and walking into a room equipped with a CSB connected to a plurality of electronic devices may trigger the CSB to activate a smart television and a plurality of IoT light bulbs in the room, if the user issues a command to turn on the IoT light bulbs via the CSB and also instructs the CSB to display the real-time power consumption of the IoT light bulbs on the smart television. Then, if the user walks out of the room, the CSB may automatically deactivate the plurality of IoT light bulbs and the smart TV to conserve energy.

Moreover, the CSB may also provide consolidation of portals for IoT device-related access and control. For example, the CSB can be configured to combine and convert a multiple number of conventional IoT device control user interfaces accessible by a computer or a mobile device into one coherent consolidated user interface that can be accessed by an end-user device. Furthermore, the CSB may also accommodate interrupt-driven events from IoT devices to display, inform, alert, or record the substance of such interrupt-driven events in the CSB or the end-user device operatively connected to the CSB. For example, if an IoT refrigerator detects one of its front doors to be ajar, the IoT refrigerator can send an alert signal as an interrupt-driven event to the CSB, which in turn transmits corresponding alert to the end-user device to sound an alarm and/or to display the alert on the end-user device. In addition, the CSB may also incorporate proximity sensing and proximity-based device interaction prioritization for the user, wherein IoT devices that are geographically in close proximity to the end-user device prompt one or more corresponding mobile applications to launch automatically on the end-user device to access and/or control the IoT data or multimedia contents.

This potential sling command pathway can be implemented with a matching pair of WiFi, WiGig, GigE transceivers, and/or wireless network routers. Alternatively, the potential sling command pathway can also be supported by peer-to-peer direct communication protocols, such as Bluetooth and HDMI standards. Furthermore, the potential sling command pathway shown in FIG. 11 may be wireless, physical-cable connected, or a combination of both wired and wireless configurations.

In this embodiment, an end target device for a sling command is a multimedia content storage or a content hub (e.g. a media storage and playback system, a television set-top box, an optical media disc player, a game console, etc.), which is intermediated by the CSB for seamless interoperability in slinging command executions between each sling command-initiating device and the end target device for slinging operations. In other embodiments of the invention, one or more targeted devices may be other electronic devices that incorporate display units. Furthermore, the presence of CSB's in executing multimedia sling commands may not be necessary in some embodiments, if devices are able to establish direct multimedia content transfer compatibility for casting and slinging activities.

In some embodiments of the invention, when a plurality of casted or slinged contents are transferred, processed, and displayed by one or more electronic devices, it becomes visually difficult for the user to track or intuitively recognize the origin of each casted or slinged content. The user may also be confused as to what is being casted and what is being slinged on a display panel. The confusion may be even more pronounced if a multiple number of users is concurrently engaged in casting and slinging of multimedia or IoT data to one or more display panels.

Therefore, in a preferred embodiment of the invention, when a casted or slinged content (e.g. video, graphics, photos, IoT data, etc.) is displayed on a display panel of an end-user device, a window frame that encapsulates the casted or slinged content in the end-user device can be dynamically color-coded to match the window frame color of the content source device. If a CSB is intermediating transmission of the content and is also displaying the content on a separate display panel connected to the CSB, then the window frame encapsulating the casted or slinged content on the separate display panel is also color-coded to match the window frame color of the content source device. Furthermore, a displayed audio mixer interface that can be associated with a plurality of window frames for a plurality of casted or slinged contents can be dynamically color-coded during its operation to match a particular window frame color that encapsulates a content currently undergoing audio and/or volume adjustment.

In one preferred method of dynamic window frame coloring implementation for casted or slinged contents among a plurality of electronic devices, assigning colors to URL's and rendering them at the graphics engine for both the end-user device and the CSB may be desirable. Furthermore, the color palette can be monitored to ensure that each colored window frame matching for each casted or slinged content remains unique to one particular color. If casting or slinging of a particular content is terminated, then a particular color that was previously assigned to the casting or the slinging of the particular content can be recycled into a fresh color palette pool for future color-coding assignments to future casting or slinging activities.

Various embodiments of the present invention provide several advantages over conventional solutions for conducting, controlling, and managing multimedia content sharing and transfers.

One advantage of an embodiment of the present invention is uniquely providing a novel intermediary set-top box called a "cast-sling box" (CSB) that incorporates multimedia contents casting, slinging, transcoding, rendering, and recording capabilities for seamless interoperability of various electronic devices in a multiple display device environment.

Furthermore, another advantage of an embodiment of the present invention is providing a set of intuitive user gesture commands executed on an electronic device that enable simplified and seamless interoperability and multimedia data transfers among a plurality of electronic devices in a multiple display device environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims presented herein.

What is claimed is:

1. An integrated cast and sling system comprising:
a cast-sling box (CSB) containing a CPU or an APU, a memory unit, and at least one of a wireless LAN chipset, PCIe and PCM interfaces, a WiGig module connected to a PCIe interface, an audio codec connected to a USB interface, an IR blaster unit connected to a GPIO interface, an HDMI bridge unit for wireless HDMI input receivers, a voltage regulator, and a power supply;
a cast and sling processing module executed and operated by a gesture-based multimedia casting and slinging command device or by the CSB, wherein the cast and sling processing module comprising circuitry that incorporates a user gesture interpreter, a user gesture command receiver, a sling gesture command encoder, and a cast gesture command encoder, wherein the user gesture interpreter determines a user's finger swipe gesture as a multimedia sling command involving an inbound playback transfer from a targeted device to the gesture-based multimedia casting and slinging command device intermediated by the CSB, and in another instance, the user's swipe gesture as a multimedia cast command to trigger multimedia content transmissions outbound playback transfers from the gesture-based multimedia casting and slinging command device to the targeted device intermediated by the CSB, and wherein the cast and sling processing module is also configured to determine and process cast-to-sling-to-cast-to-sling and sling-to-cast-to-sling-to-cast cascaded commands involving multi-level-depth intermediary and multiple target devices;
the sling gesture command encoder comprising circuitry configured to encode the multimedia sling command as an inbound playback transfer request to the targeted device via the CSB for a localized playback at the gesture-based multimedia casting and slinging command device, wherein an established line-of-sightedness between the gesture-based multimedia casting and slinging command device and the CSB triggers an intelligent machine-determined selection of a highest throughput and uncompressed communication protocol for the multimedia inbound transfer, and wherein a lost line-of-sightedness between the gesture-based multimedia casting and slinging command device and the CSB triggers an intelligent machine-determined seamless switchover to a next-best protocol that provides a second-highest data throughput under a current inter-device proximity between the gesture-based multimedia casting and slinging command device and the CSB; and
the cast gesture command encoder comprising circuitry configured to encode the multimedia cast command as an outbound playback transfer request to the targeted device via the CSB for a remote playback at the targeted device, wherein an increased inter-device proximity between the gesture-based multimedia casting and slinging command device and the CSB during an execution of the multimedia cast command triggers an automatic activation of a separate electronic device located near the CSB and the targeted device to enhance a user's viewing experience from the targeted device, and wherein a worsened inter-device proximity between the gesture-based multimedia casting and slinging command device and the CSB during the execution of the multimedia cast command triggers an automatic deactivation of the separate electronic device located near the CSB to conserve energy.

2. The integrated cast and sling system of claim 1, further comprising a touchscreen sensor interface, a graphics unit, a touchscreen display unit, and a microprocessor in the gesture-based multimedia casting and slinging command device to receive, convert, and transmit the user's finger swipe gesture as electrical signals to the cast and sling processing module.

3. The integrated cast and sling system of claim 1, wherein the user's finger swipe gesture is a swipe-down gesture for the multimedia sling command involving the inbound playback transfer from the targeted device to the gesture-based multimedia casting and slinging command device intermediated by the CSB.

4. The integrated cast and sling system of claim 1, wherein the user's finger swipe gesture is a swipe-up gesture for the multimedia cast command involving the outbound playback transfers from the gesture-based multimedia casting and slinging command device to the targeted device intermediated by the CSB.

5. The integrated cast and sling system of claim 1, wherein the targeted device is a television, a computer display panel, an additional cast-sling box, a portable electronic device with a display panel, or an audio output device.

6. The integrated cast and sling system of claim 1, wherein the gesture-based multimedia casting and slinging command device is a smart phone, a tablet computer, a notebook computer, an additional cast-sling box, or another electronic device that executes a user gesture interface application associated with the user gesture interpreter in the cast and sling processing module.

7. The integrated cast and sling system of claim 6, wherein the user gesture interface application is an Android mobile app, an Apple mobile app, a PC-compatible application, or a MAC OS-compatible application.

8. The integrated cast and sling system of claim 1, wherein the user's finger swipe gesture further includes a swipe-left gesture as an audio content sling command and a swipe-right gesture as an audio content cast command.

9. The integrated cast and sling system of claim 1, wherein the gesture-based multimedia casting and slinging command device and the targeted device are intermediated by a cast-sling box (CSB), which transcodes or relays the multimedia sling command, the multimedia cast command, or multimedia data between the gesture-based multimedia casting and slinging command device and the targeted device.

10. The integrated cast and sling system of claim 1, wherein the targeted device is a cast or sling command-recipient device and wherein the targeted device incorporates a user gesture command receiver, a sling gesture command decoder, and a cast gesture command decoder to decipher, comply with, or deny the multimedia sling command or the multimedia cast command from the gesture-based multimedia casting and slinging command device.

11. The integrated cast and sling system of claim 1, wherein the targeted device and the gesture-based multimedia casting and slinging command device are configured to communicate data via at least one of a wireless local area network, a cellular network, a wide-area network, a satellite network, a wired network, or a peer-to-peer direct connection.

12. The integrated cast and sling system of claim 1, wherein the targeted device is selected among a plurality of available target devices by a direct line of sight to the targeted device indicated by the user's finger swipe-down gesture for the multimedia sling command or the user's finger swipe-up gesture for the multimedia cast command on the gesture-based multimedia casting and slinging command device.

13. The integrated cast and sling system of claim 1, wherein the localized playback at the gesture-based multimedia casting and slinging command device, or the remote playback at the targeted device involves a transfer of streaming and playing audio/video (AV), graphical, or photographic multimedia contents from one device location to another device location.

\* \* \* \* \*